Patented Aug. 16, 1949

2,479,297

UNITED STATES PATENT OFFICE 2,479,297

PROCESS AND CULTURE MEDIA FOR PRODUCING NEW PENICILLINS

Otto K. Behrens, Joseph W. Corse, Reuben G. Jones, and Quentin F. Soper, Indianapolis, Ind., assignors to Eli Lilly and Company, Indianapolis, Ind., a corporation of Indiana No Drawing. Application March 8, 1946, Serial No. 653,138

3 Claims. (Cl. 195—36)

This invention relates to antibiotic compounds and is directed to novel penicillins and to processes of producing them.

There are certain known penicillins comprising a group of chemically related compounds which, under suitable conditions of growth, are produced as metabolic products by a penicillin-producing mold. The complete molecular structures of these compounds have not been definitely established but sufficient elucidation of structure has been accomplished to allow the assignment to them of the following empirical formula:

$$R_o\text{—}C_{10}H_{13}N_2O_4S$$

wherein $R_o$ represents an organic radical which is characteristic of each individual penicillin.

These known penicillins comprise a group of six penicillins wherein the $R_o$ radical hereinbefore referred to represents a butene-1-yl, butene-2-yl, n-butyl, n-hexyl, phenyl or a p-hydroxyphenyl radical. It is known, furthermore, that in the normal fermentative production these six penicillins are formed in admixture.

We have made the surprising discovery that a penicillin-producing mold may be induced to produce a novel penicillin, by incorporating in the nutrient medium wherein the mold is grown, a selected organic compound, called herein a precursor compound. Such selected precursor compound, although foreign to the normal metabolic requirements of the mold, may be metabolized and incorporated in substantial part in the molecule of a novel penicillin. This result is especially surprising in view of the recognized specificity of the enzyme systems whereby lower organisms maintain growth and development. It is further surprising that use of a selected precursor compound may lead to the production of a novel penicillin to the substantial exclusion of the known and normally-produced penicillins.

Thus, by this invention there are provided not only methods of producing novel penicillins without substantial concomitant production of known and normally-produced penicillins, but also there are provided methods of producing novel penicillins which incorporate substantial portions of selected precursor compounds.

In accordance with one aspect of this invention, there are provided novel penicillins. In accordance with another aspect, there are provided methods of obtaining novel penicillins by a fermentative process which comprises growing a penicillin-producing mold in a nutrient medium in the presence of a selected precursor compound which the mold may metabolize and incorporate in substantial part in the molecule of a novel penicillin.

The present invention in its composition aspect contemplates novel products of fermentative processes which comprise growing a penicillin-producing mold in association with a culture medium containing nutrient material and a selected precursor compound, said product as produced consisting essentially of a penicillin represented by the formula $$R\text{—}C_{10}H_{13}N_2O_4S$$

wherein R represents an aliphatic radical other than the butene-1-yl, butene-2-yl, n-butyl and n-hexyl radicals; a carbocyclic-including radical other than the phenyl and p-hydroxyphenyl radicals; or a heterocyclic-including radical. Thus, the aliphatic radicals which R may represent include straight-chain, branched-chain, saturated, and unsaturated radicals, illustrative examples of which are $\Delta^8$-nonenyl, allyl and tertiary butyl radicals. Additional aliphatic radicals which R may represent are those which contain as a member of the chain an interrupting group such as oxygen, sulfur, nitrogen and the like, for example the allyloxy and ethylmercapto radicals. The carbocyclic-including radicals which R may represent include fully saturated and partially or completely unsaturated carbocyclic nuclei, illustrative examples of which are the 5,6,7,8-tetrahydro-2-naphthyl, cyclopentyl, and cyclohexenyl radicals. Additional carbocyclic-including radicals which R may represent are those wherein the carbocyclic nucleus is attached to the —$C_{10}H_{13}N_2O_4S$ moiety by an aliphatic group or by some atom or group not containing carbon. Illustrative examples of such radicals are the benzylmercapto, phenoxy, styryl and $\alpha,\alpha$-dimethylbenzyl radicals. The heterocyclic-including radicals which R may represent includes the thienyl radical and heterocyclic-including radicals wherein the heterocyclic nucleus is attached to the —$C_{10}H_{13}N_2O_4S$ moiety by an aliphatic group or by some atom or group not containing carbon. An illustrative example is the $\alpha$-(2-thienyl)-ethyl radical.

Further specific examples of aliphatic, carbocyclic-including and heterocyclic-including radicals falling within the ambit of this invention are the vinyl, ethoxy, cyclopentenyl, cyclohexyl, 2,4-dichlorophenyl, 3,4-dichlorophenyl, m-bromophenyl, o-bromophenyl, p-bromophenyl, m-chlorophenyl, o-chlorophenyl, p-chlorophenyl, m-fluorophenyl, o-fluorophenyl, p-fluorophenyl, p-iodophenyl, p-nitrophenyl, p-chlorophenoxy, m-nitrophenyl, o-nitrophenyl, 3-chloro-4-bromophenyl, m-trifluoromethylphenyl, m-trifluoromethylphenoxy, p-tolyl, o-methylphenyl, m-methylphenyl, phenylmercapto, p-methylmercaptophenyl, phenylseleno, o-methoxyphenyl, m-methoxyphenyl, o-methylphenoxy, p-methoxyphenoxy, p-cyanophenyl, styryl, 3,4-dimethylphenyl, β-phenylbutyryl, p-carbethoxyhydroxyphenyl, β-naphthyl, β-naphthoxy, 1-bromo-2-naphthyl, 6-bromo-2-naphthyl, 2-chloro-3-naphthyl, 6-fluoro-2-naphthyl, 1-nitro-2-naphthyl, β-naphthylmercapto, 6-methoxy-2-naphthyl, p-phenoxyphenyl, p-isopropylphenyl and p-benzyloxyphenyl radicals.

For convenience, the new penicillins are named by reference to the particular R radical contained therein. Thus, for example, a penicillin wherein the R of the next preceding formula is the 2-thienyl radical is named 2-thienyl-penicillin.

In accordance with the method aspect of this invention, methods are provided whereby novel penicillins are produced by growing a penicillin-producing mold in a culture medium containing nutrient material and a selected precursor compound which the mold may metabolize and incorporate in substantial part in the molecule of a novel penicillin. Precursor compounds useful for the purposes of this invention comprise monosubstituted acetic acids represented by the formula

R—CH₂COOH wherein R represents an aliphatic radical other than the butene-1-yl, butene-2-yl, n-butyl and n-hexyl radicals; a carbocyclic-including radical other than the phenyl and p-hydroxyphenyl radicals; or a heterocyclic-including radical. In place of the monosubstituted acetic acids represented by the formula hereinabove there may be used equivalents of such acetic acids, said equivalents comprising those compounds readily converted by the mold to the monosubstituted acetic acids. Such equivalents include simple derivatives of the acids such as their salts, esters, amides and anhydrides, as well as ω-substituted, saturated straight chain alcohols, amines, aldehydes and acids containing an even number of carbon atoms, and the simple derivatives thereof, all of which the mold may convert to the monosubstituted acetic acids. Examples of equivalents include sodium β-naphthylacetate, N-(2-thienyl)-acetyl-valine, β-p-tolylethanol, N-(2-hydroxyethyl)-γ-(p-bromophenyl)-butyramide, β-chloropropionaldehyde diethylacetal, p-methoxyphenethylamine hydrochloride and ethyl vinylacetate.

Broadly speaking, a method of producing a novel penicillin in accordance with this invention is as follows: There is provided a nutrient medium suitable for the growth of a penicillin-producing mold. To the nutrient medium is added in effective amount a precursor compound comprising a monosubstituted acetic acid or its equivalent. The culture medium composition comprising nutrient material and precursor compound is inoculated with a penicillin-producing mold and the mold is grown under penicillin-producing conditions, during which growth a new penicillin is produced by the mold as a metabolic product. After mold growth the mold mycelium is separated from the culture medium, and from the latter the novel penicillin is separated.

The isolation of the new penicillin may be effected by methods known to the art, such as adsorption and extraction to obtain a product sufficiently pure for practical purposes. If a purer product is desired, the new penicillin may be subjected to additional methods of purification such as partition chromatography, elution and recrystallization as indicated in the illustrative examples to follow.

The novel penicillin desirably is recovered in the form of one of its salts, for example the sodium salt. Identification of the novel penicillin may be confirmed by methods known to the art, such methods comprising analysis, spectroscopic absorption, X-ray diffraction and antibacterial tests.

The nutrient material used in the composition wherein the mold is grown may comprise ingredients such as water, sugars, inorganic salts and desirably one or more indeterminate compositions such as corn steep amino acids and bran. Numerous suitable nutrient media comprising materials of the type mentioned are known to the art.

During the growth of the mold the culture medium comprising nutrient material and precursor compound is maintained at a suitable temperature, for example, in the range of 20–30° C. The range of temperature which has been found to be particularly suitable is from 24–26° C. The period of time during which the mold is grown will depend upon the objective desired. Thus the mold may be grown only during the period of its maximum rate of growth before mold growth is interrupted preliminary to isolating the new penicillin. Such a period generally is from 2 to 3 days. On the other hand, the mold may be grown for a longer period of time to obtain the maximum yield of new penicillin. In such a case, mold growth is usually continued for about five days.

The mold may be grown under various conditions. For example, the mold may be grown without agitation of the culture medium, in which case the mold grows on the surface of the medium. Alternatively the culture medium may be agitated by shaking or stirring during the growth of the mold in which case the mold is dispersed throughout the culture medium and grows while so dispersed.

The molds suitable for the purposes of this invention are mold organisms of the type capable of producing penicillins. Such organisms include molds of the *Penicillium notatum-chrysogenum* group as well as certain molds of the Aspergillus group. It is to be understood that not all mold strains are equally efficient for the purposes of this invention. By way of example, mold strains suitable for the purposes of this invention are those known as strains X1612 and Q-176 of the *Penicillium notatum-chrysogenum* group and strain G147 of the *Aspergillus flavus* group.

The concentration of the precursor compounds employed in the culture medium may vary over a substantial range. The precursor compounds may be present in the culture medium in concentrations to the order of about 1 percent, but it is usually desirable that smaller concentrations be employed since there is no particular advantage to be gained in employing concentrations in substantial excess of those necessary to produce the optimum effect. It appears at present that the optimum concentration of the monosubstituted acetic acids and derivatives thereof lies in the range of about 0.01 to about 0.05 percent on a weight volume basis when mold strain X1612 is used, and that this optimum concentration may range upwardly when mold strain Q-176 is used.

The precursor compound may be associated with the mold and culture medium at any suitable time. Thus the materials of the nutrient medium may be inoculated with the mold and the precursor compound to be employed may be incorporated either before or after inoculation of the culture medium with the mold.

The molecular structures of the precursor compounds have an important effect in determining what portions of the precursor molecules will be incorporated in the new penicillin. Thus for example, p-bromophenylacetic acid, β-p-bromophenethanol, and γ-(p-bromophenyl)-butyric acid when incorporated in culture media wherein the mold is grown, will each lead to the production of the same new penicillin, namely, p-bromophenyl-penicillin. On the other hand, it has been observed that certain molecular structures not only fail to produce a new penicillin but have no apparent effect upon the metabolism of the mold when employed in the preferred concentrations. Illustratively, β-(p-bromophenyl)-propionic acid represents a compound which in association with nutrient material fails to stimulate the production of a novel penicillin.

The following explanation is offered as to what occurs in the practice of the method of producing new penicillins as herein disclosed, it being understood that such explanation is not to be construed as in any way affecting the scope of the invention. It appears that the results obtained can be attributed in part at least to an oxidation effected by the mold, and in particular cases, to a degradation which is analogous to β-oxidation if indeed it is not actually β-oxidation. Thus, it is believed that -β-p-bromophenethanol is enzymatically oxidized by the mold to p-bromophenylacetic acid, the latter being the operative precursor compound. It is believed that γ-(p-bromophenyl)-butyric acid undergoes a degradation of the aliphatic chain portion of its molecule which degradation is akin to β-oxidation, whereby it is converted to p-bromophenylacetic acid which, as noted above, is utilized by the mold and incorporated in the new penicillin. On the other hand, degradation of β-(p-bromophenyl)-propionic acid by a process of β-degradation will not result in the formation of a substituted acetic acid, but instead will form a substituted benzoic acid, namely, p-bromobenzoic acid. According to this concept, it is only monosubstituted acetic acids which can be utilized by the mold, and the degradation product of p-bromophenyl-propionic acid, not being a mono-substituted acetic acid but rather a benzoic acid, can have no effect in producing a new penicillin. Further substantiating this view is the result obtained with β-phenyl-β,β-dimethyl propionic acid whose use as a precursor compound will lead to the formation of α,α-dimethylbenzylpenicillin. According to the present concept, the presence of both the methyl and phenyl groups on the β-carbon atom renders the molecule incapable of a β-degradation, and accordingly the compound represents an acetic acid which is monosubstituted with an α,α-dimethylbenzyl radical, and is utilized as such. The presence of other groups such as unsaturated groups, or interrupting atoms such as sulfur or oxygen, likewise may prevent the degradation of a carbon chain. Thus for example, p-tolymercaptoacetic acid which is analogous to β-(p-methylphenyl)-propionic acid except that in the aliphatic carbon chain a —CH₂— group is replaced by an —S— group is not degraded to the benzoic acid, but is utilized as such, and leads to the formation of p-tolylmercapto-penicillin.

The present application is directed to novel culture media and the production of new penicillins by a method which comprises growing a penicillin-producing mold in a culture medium containing nutrient material and a relatively small amount of a precursor compound represented by the formula

R—(CH₂)ₙ—X in which R represents a monocyclic radical having a five-membered sulfur-containing ring, n represents an odd integer from 1 to 5 inclusive and X represents a radical of the class of carboxy, carboxy-ester, carboxy-salt, carboxyamide carbinol, carbinylamine and aldehyde.

Subject matter disclosed but not claimed herein, is disclosed and claimed in copending applications Serial Nos. 653,136, 653,137, 773,488, 773,489 and 773,490. Applications Serial Nos. 773,488, 773,489, and 773,490 are abandoned.

The following specific examples further illustrate the practice of this invention.

*Example 1*

The sodium salt of p-methoxyphenyl-penicillin represented by the formula:

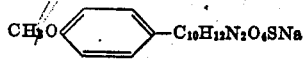

may be prepared in the following manner:

A culture medium may be prepared in the following proportions:

| | |
|---|---|
| Lactose _____ g__ | 125 |
| Corn steep solids _____ g__ | 100 |
| Calcium carbonate _____ g__ | 10 |
| N-(2 - hydroxyethyl) - p - methoxyphenyl-acetamide _____ g__ | 0.84 |
| Water _____ cc__ | 5,000 |

The culture medium is distributed in 200 cc. portions in 1 liter Erlenmeyer flasks, sterilized, inoculated with a spore suspension of Penicillium mold, strain N. R. R. L. 1976, and stoppered with cotton plugs. The flasks are maintained at a temperature of about 23–26° C. and shaken constantly for five days. The flask contents are then filtered to remove the mold mycelium, the filtrated cooled to about 0° C., acidified to about pH 2.2 with orthophosphoric acid and shaken with an equal volume of amyl acetate. The amyl acetate layer is separated and extracted with three successive 100 cc. portions of cold water to which cold N/10 sodium bicarbonate solution is added during the course of each extraction until a pH of about 7.0 to 7.3 is attained in the aqueous phase. The aqueous extracts are combined, cooled to about 0° C., acidified to about pH 2.2 with orthophosphoric acid and extracted successively with three 100 cc. portions of ether. The ether extracts are combined, and are passed through a chromatographic type silica adsorption column about 30 mm. in diameter and 250 mm. long and containing a pH 6.2 phosphate buffer. The silica column is developed by percolation with six 100 cc. portions of ether containing successively increasing amounts of methanol in the order of ½, 1, 1½, 2, 2½, and 3 percent.

The developed silica column is divided into about 12 equal sections and each section is eluted with three 30 cc. portions of M/15 phosphate buffer of pH 7.0. The eluates are assayed bacteriologically to determine their penicillin content. 79 percent of the total antibiotic activity possessed by all the eluates originates in a single band in the silica column and results from the presence of p-methoxyphenyl-penicillin. This band occupies a position similar to that in which penicillin G is found in comparable columns. Those eluates representing the sections of the silica column comprising this major, uniform band, are combined, cooled to about 0° C., acidified to about pH 2.2 and extracted with three 50 cc. portions of chloroform. The combined chloroform extracts are passed through a silica adsorption column containing a pH 6.2 phosphate buffer. This silica column is developed by percolation with three 150 cc. portions of chloroform containing successively increasing amounts of methanol in the order of 1, 2 and 3 percent. The developed silica column is then divided into 12 equal sections and each section is eluted with three 30 cc. portions of M/15 phosphate buffer of pH 7.0. Bacteriological assay shows that 92 percent of the total antibiotic acitivity originates in a single band in the silica column. The eluates obtained by extraction of the silica column sections which comprise this band are combined, cooled to about 0° C., acidified to about pH 2.2 and extracted with three 100 cc. portions of ether. The ether extracts are combined and extracted with about 75 cc. of a cold, dilute aqueous solution of sodium hydroxide to which N/10 sodium hydroxide is added during the course of the extraction so that a final pH of about 7.0 is attained in the aqueous phase. From the aqueous solution, the sodium salt of p-methoxyphenyl-penicillin may be separated by any suitable means, for example, by freezing and evaporation in vacuo from the frozen state.

The dry amorphous sodium salt of p-methoxyphenyl-penicillin is triturated with 1 cc. of acetone in which it almost completely dissolves but from which upon standing, it precipitates in crystalline form. The mixture is centrifuged and the sodium salt is washed with 5 cc. of absolute acetone. The sodium salt is obtained in purified form by solution in 1 cc. of 90 percent aqueous acetone and reprecipitation by the addition of 4 cc. of absolute acetone.

The sodium salt of p-methoxyphenyl-penicillin prepared according to the above procedure assayed about 1510 Oxford units per mg. when tested against *Staph. aureus*, strain 209P. A differential assay carried out on *Staph. aureus* strain 209P and *B. subtilis* strain N. R. R. L. B–558 gave a value of about 0.82. The optical rotation was found to be $$[\alpha]_D^{30°} = +278°$$

as a 0.3 percent solution in water. Analysis showed the presence of 52.51 percent carbon, 4.99 percent hydrogen and 7.20 percent nitrogen as compared with the calculated values of 52.86 percent carbon, 4.92 percent hydrogen and 7.25 percent nitrogen. A methoxyl determination gave a value of 7.9 as compared with a calculated value of 8.0.

Example 2

The sodium salt of p-methoxyphenyl-penicillin may also be prepared in the following manner:

A culture medium may be prepared in the following proportions:

| | | |
|---|---|---|
| Lactose | g | 125 |
| Corn steep solids | g | 150 |
| Calcium carbonate | g | 25 |
| p-Methoxyphenyl acetic acid | g | 0.66 |
| Water | cc | 5,000 |

The culture medium is distributed in 200 cc. portions in 1 liter Erlenmeyer flasks, sterilized, inoculated with a spore suspension of Penicillium mold, strain X1612, and stoppered with cotton plugs. The flasks are maintained at a temperature of about 23–26° C. and shaken constantly for five days. The flask contents are then filtered to remove the mold mycelium. The p-methoxyphenyl-penicillin present in the filtrate may be isolated and purified according to the procedure described in Example 1.

The sodium salt of p-methoxyphenyl-penicillin thus prepared possesses the same characteristics and is identical with the p-methoxyphenyl-penicillin sodium salt prepared according to the procedure given in Example 1.

Example 3

The sodium salt of p-methoxyphenyl-penicillin may also be prepared by growing Penicillium mold, strain X1612, in a culture medium of the following composition:

| | | |
|---|---|---|
| Lactose | g | 125 |
| Corn steep solids | g | 150 |
| Calcium carbonate | g | 25 |
| Ethyl p-methoxyphenyl acetate | g | 0.77 |
| Water | cc | 5,000 |

The mold is grown in the culture medium and the p-methoxyphenyl-penicillin is isolated and purified according to the procedure described in Example 1.

The sodium salt of p-methoxyphenyl-penicillin thus obtained is identical with the p-methoxyphenyl-penicillin sodium salt obtained by the procedure described in Example 1.

Example 4

The sodium salt of p-methoxyphenyl-penicillin may also be prepared in the following manner.

A culture medium is prepared as shown in Example 3 except that in place of the 0.77 g. of ethyl p-methoxyphenylacetate there is employed 2.5 g. of p-methoxyphenylethylamine. The culture medium is distributed in 200 cc. portions in 1 liter flasks, sterilized, and inoculated with a spore suspension of Penicillium mold, strain X1612. The growth of the mold and isolation and purification of the p-methoxyphenyl-penicillin are carried out according to the procedure described in Example 1.

The sodium salt of p-methoxyphenyl-penicillin thus obtained is identical with that obtained by the procedure described in Example 1.

Example 5

The sodium salt of α-thienyl-penicillin represented by the formula

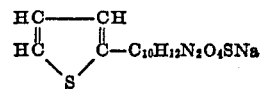

may be prepared in the following manner:

A culture medium may be prepared in the following proportions:

| | | |
|---|---|---|
| Lactose | g | 125 |
| Corn steep solids | g | 100 |
| Calcium carbonate | g | 10 |
| N-(2-hydroxyethyl)-α-thienyl-acetamide | g | 0.72 |
| Water | cc | 5,000 |

The culture medium is distributed in 200 cc. portions in 1 liter Erlenmeyer flasks, sterilized, inoculated with a spore suspension of Penicillium mold, strain N. R. R. L. 1976, and stoppered with cotton plugs. The flasks are maintained at a temperature of about 23–26° C. and shaken constantly for five days. The flask contents are then filtered to remove the mold mycelium, the filtrate cooled to about 0° C., acidified to about pH 2.2 with orthophosphoric acid and shaken with about one half its volume of amyl acetate. The amyl acetate layer is separated and extracted with three 100 cc. portions of cold water to which cold N/10 sodium bicarbonate solution is added during the course of each extraction until a pH of about 7.1 to 7.3 is attained in the aqueous phase. The aqueous extracts are combined, cooled to about 0° C., acidified to about pH 2.2 with orthophosphoric acid and extracted with three 100 cc. portions of ether. The ether extracts are combined, dried over magnesium sulfate and are then passed through a chromatographic type silica adsorption column about 30 mm. in diameter and 300 mm. long, and containing a pH 6.2 phosphate buffer. The silica column is developed by percolation with six 100 cc. portions of ether containing successively increasing amounts of methanol in the order of ½, 1, 1½, 2, 2½, and 3 percent.

The developed silica column is divided into about 12 equal sections and each section is eluted with three 30 cc. portions of M/15 phosphate buffer of pH 7.0. The eluates are assayed bacteriologically to determine their penicillin content. 91 per cent of the total antibiotic activity possessed by all the eluates originates in a single band in the silica column and results from the presence of α-thienyl-penicillin. This band occupies a position similar to that in which penicillin G is found in comparable columns. The eluates obtained from the silica gel sections which make up this uniform band are combined, cooled to about 0° C., acidified to about pH 2.2 with orthophosphoric acid and extracted with three 50 cc. portions of chloroform. The combined chloroform extracts are then passed through a silica adsorption column containing a pH 6.2 phosphate buffer. This silica gel column is developed by percolation with three 100 cc. portions of chloroform containing successively increasing amounts of methanol in the order of 1, 2 and 3 percent. The developed silica column is then divided into 12 equal sections and each section is eluted with three 30 cc. portions of M/15 phosphate buffer of pH 7.0. Bacteriological assay of the eluates shows 95 percent of the total antibiotic activity concentrated in a single band in the silica column. The eluates obtained by extraction of the silica column sections which comprise this band are combined, cooled to about 0° C., acidified to about pH 2.2 and extracted with three 100 cc. portions of ether. The ether extracts are combined and extracted with about 75 cc. of a cold dilute aqueous solution of sodium hydroxide to which N/10 sodium hydroxide solution is added during the course of the extraction so that a final pH of about 7.0 is obtained in the aqueous phase. From this aqueous solution the sodium salt of α-thienyl-penicillin may be isolated by any suitable means, for example, by freezing and evaporation in vacuo from the frozen state.

The resulting dry sodium salt of the α-thienyl-penicillin is washed several times with anhydrous acetone. The sodium salt is then crystallized by dissolving it in 2 cc. of 90 percent acetone and reprecipitating it with 2 cc. of anhydrous acetone. 213 mg. of the sodium salt of α-thienyl-penicillin is obtained.

The sodium salt of α-thienyl-penicillin prepared according to the above procedure assayed about 1685 Oxford units per mg. when tested against Staph. aureus strain 209P. A differential assay carried out on Staph. aureus, strain 209P, and B. subtilis, strain N. R. R. L. B–558, gave a value of about 1.13. The optical rotation was found to be $$[\alpha]_D^{20°} = +265°$$

as a 0.3 percent solution in water. Analysis showed the presence of 46.46 percent carbon, 3.81 percent hydrogen, 7.40 percent nitrogen and 17.18 percent sulfur as compared with the calculated values of 46.40 percent carbon, 4.17 percent hydrogen, 7.73 percent nitrogen and 17.69 percent sulfur.

*Example 6*

The sodium salt of p-chlorophenyl-penicillin represented by the formula

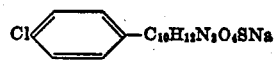

may be prepared in the following manner:

A culture medium may be prepared in the following proportions:

| | |
|---|---|
| Lactose _____g__ | 125 |
| Corn steep solids _____g__ | 100 |
| Calcium carbonate _____g__ | 10 |
| N-p-chlorophenylacetylvaline _____g__ | 1.1 |
| Water _____cc__ | 5,000 |

The culture medium is distributed in 200 cc. portions in 1 liter Erlenmeyer flasks, sterilized, inoculated with a spore suspension of Penicillium mold, strain N. R. R. L. 1976, and stoppered with cotton plugs. The flasks are maintained at a temperature of about 23–26° C. and shaken constantly for five days. The flask contents are then filtered to remove the mold mycelium, the filtrate cooled to about 0° C., acidified to about pH 2.2 with orthophosphoric acid and shaken with an equal volume of amyl acetate. The amyl acetate layer is separated and extracted with three 100 cc. portions of cold water to which N/10 sodium bicarbonate solution is added during the course of each extraction until a pH of about 7.1 to 7.3 is attained in the aqueous phase. The aqueous extracts are combined, cooled to about 0° C., acidified to about pH 2.2 with orthophosphoric acid and extracted with three 100 cc. portions of ether. The ether extracts are combined, and are passed through a chromatographic type silica adsorption column about 30 mm. in diameter and 300 mm. long, and containing a pH 6.2 phosphate buffer. The silica column is developed by percolation with six 100 cc. portions of ether containing successively increasing amounts of methanol in the order of ½, 1, 1½, 2, 2½, and 3 percent.

The developed silica column is divided into about 12 equal sections and each section is eluted with three 30 cc. portions of M/15 phosphate buffer of pH 7.0. The eluates are assayed bacteriologically to determine their penicillin content. About 92 percent of the total antibiotic activity possessed by all the eluates originates in a single band in the silica column and results from the presence of p-chlorophenyl-penicillin. This band occupies a position similar to that in which penicillin K is found in comparable columns. The eluates obtained from the silica gel sections which make up this uniform band are combined, cooled to about 0° C., acidified to about pH 2.2 and extracted with three 50 cc. portions of chloroform. The combined chloroform extracts are then passed through a silica adsorption column containing a pH 6.2 phosphate buffer. This silica gel column is developed by percolation with three 100 cc. portions of chloroform containing successively increasing amounts of methanol in the order of 1, 2 and 3 percent. The developed silica column is then divided into 12 equal sections and each section is eluted with three 30 cc. portions of M/15 phosphate buffer of pH 7.0. Bacteriological assay of the eluates shows that about 97 percent of the total antibiotic activity originates in a single band in the silica column. The eluates obtained by extraction of the silica column sections which comprise this band are combined, cooled to about 0° C., acidified to about pH 2.2 and extracted with three 100 cc. portions of ether. The ether extracts are combined and extracted with about 75 cc. of a cool dilute aqueous solution of sodium hydroxide to which N/10 sodium hydroxide solution is added during the course of the extraction so that a final pH of about 7.0 is obtained in the aqueous phase. From this aqueous solution the sodium salt of p-chlorophenyl-penicillin may be separated by any suitable means, for example by freezing and evaporation in vacuo from the frozen state.

The resulting dry sodium salt of p-chlorophenyl-penicillin is washed with several portions of anhydrous acetone. It is crystallized by dissolving it in 2 cc. of 90 percent aqueous acetone followed by the addition of 4 cc. of anhydrous acetone. The salt is recrystallized by dissolving it in 2 cc. of 90 percent aqueous acetone and subsequently adding 2 cc. of anhydrous acetone.

The sodium salt of p-chlorophenyl-penicillin prepared according to the above procedure assayed about 2460 Oxford units per mg. when tested against Staph. aureus, strain 209P. A differential assay carried out on Staph. aureus, strain 209P, and B. subtilis, strain N. R. R. L. B–558, gave a value of about 0.73. The optical rotation was found to be $$[\alpha]_D^{30°} = +260°$$

as a 0.3 percent solution in water. Analysis showed the presence of 49.08 percent carbon, 3.84 percent hydrogen, 7.30 percent nitrogen and 8.85 percent chlorine as compared with the calculated values of 49.17 percent carbon, 4.12 percent hydrogen, 7.17 percent nitrogen and 9.07 percent chlorine.

Example 7

The sodium salt of p-chlorophenyl-penicillin may also be prepared in the following manner:

A culture medium may be prepared in the following proportions:

| | |
|---|---|
| Lactose _____g__ | 125 |
| Corn steep solids _____g__ | 150 |
| Calcium carbonate _____g__ | 25 |
| p-Chlorophenylacetic acid _____g__ | 0.67 |
| Water _____cc__ | 5,000 |

The culture medium is distributed in 200 cc. portions in 1 liter Erlenmeyer flasks, sterilized, inoculated with a spore suspension of Penicillium mold, strain X1612, and stoppered with cotton plugs. The growth of the organism and the isolation and purification of the p-chlorophenyl-penicillin is carried out according to the procedure described in Example 6. The sodium salt of p-chlorophenyl-penicillin thus obtained is identical with p-chlorophenyl-penicillin sodium salt obtained by the procedure described in Example 6.

Example 8

The sodium salt of p-methylphenyl-penicillin represented by the formula

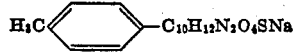

may be prepared in the following manner:

A culture medium may be prepared in the following proportions:

| | |
|---|---|
| Lactose _____g__ | 125 |
| Corn steep solids _____g__ | 100 |
| Calcium carbonate _____g__ | 10 |
| N-(2-hydroxyethyl)-p-methyl-phenylacetamide _____g__ | 0.82 |
| Water _____cc__ | 5,000 |

The culture medium is placed in a 5 gallon bottle equipped with a stirrer and an air inlet tube fitted with an air filter. The culture medium is sterilized and inoculated with a spore suspension of Penicillium mold, strain X1612. The bottle contents are maintained at a temperature of about 23–26° C. and are continuously stirred for five days. Throughout this time, air is continuously passed through the air inlet tube. The mold mycelium is then removed from the aqueous culture medium by filtration and the culture medium is cooled to about 0° C., acidified to about pH 2.2 with orthophosphoric acid and extracted with an equal volume of amyl acetate. The amyl acetate layer is separated and extracted with three 100 cc. portions of cold water to which cold N/10 sodium bicarbonate solution is added during the course of each extraction until a pH of about 7.1 to 7.3 is attained in the aqueous phase. The aqueous extracts are combined, cooled to about 0° C., acidified to about pH 2.2 with orthophosphoric acid and extracted with three 100 cc. portions of ether. The ether extracts are combined and passed through a chromatographic type silica adsorption column about 30 mm. in diameter and about 300 mm. long and which contains a pH 6.2 phosphate buffer. The silica column is developed by percolation with six 100 cc. portions of ether containing successively increasing amounts of methanol in the order of ½, 1, 1½, 2, 2½, and 3 percent.

The developed silica column is divided into about 12 equal sections and each section is eluted with three 30 cc. portions of M/15 phosphate buffer of pH 7.0. The eluates are assayed bacteriologically to determine their penicillin content. 100 percent of the total antibiotic activity possessed by all the eluates originates in a single band in the silica column and results from the presence of p-methylphenyl-penicillin. The eluates obtained from the silica gel sections which make up this uniform band are combined, cooled to about 0° C., acidified to about pH 2.2 with orthophosphoric acid and extracted with three 50 cc. portions of chloroform. The combined chloroform extracts are passed through a silica adsorption column containing a pH 6.2 phosphate buffer. The silica gel column is developed by percolation with three 100 cc. portions of chloroform containing successively increasing amounts of methanol in order of 1, 2 and 3 percent. The developed silica column is then divided into 12 equal sections and each section is eluted with three 30 cc. portions of M/15 phosphate buffer of pH 7.0. Bacteriological assay of the eluates shows that almost 100 percent of the total antibiotic activity originates in a single band in the silica column. The eluates obtained by extraction of the silica column sections which comprise this band are combined, cooled to about 0° C., acidified to about pH 2.2 with orthophosphoric acid and extracted with three 100 cc. portions of ether. The ether extracts are combined and extracted with about 75 cc. of a cold dilute aqueous solution of sodium hydroxide to which N/10 sodium hydroxide solution is added during the course of the extraction so that a final pH of about 7.0 is obtained in the aqueous phase. From this aqueous solution the sodium salt of p-methylphenyl-penicillin may be separated by any suitable means, for example by freezing and evaporation in vacuo from the frozen state.

The resulting amorphous, dry sodium salt of p-methylphenyl-penicillin is treated with 2 cc. of absolute acetone in which it almost completely dissolves but from which it rapidly crystallizes. The mixture is allowed to stand two hours, is centrifuged, washed with several portions of absolute acetone and then dissolved in 2 cc. of 90 percent aqueous acetone and precipitated by the addition of 4 cc. of absolute acetone. The salt is recrystallized by dissolving it in about 2.6 cc. of 37 percent aqueous acetone followed by the addition of 5.7 cc. of absolute acetone.

The sodium salt of p-methylphenyl-penicillin prepared according to the above procedure assayed about 2285 Oxford units per milligram when tested against *Staph. aureus*, strain 209P. A differential assay carried out on *Staph. aureus*, strain 209P, and *B. subtilis*, strain N. R. R. L. B-558 gave a value of about 0.73. Analysis showed the presence of 55.12 percent carbon, 5.43 percent hydrogen, 7.49 percent nitrogen and 8.56 percent sulfur as compared with the calculated values of 55.12 percent carbon, 5.17 percent hydrogen, 7.56 percent nitrogen and 8.66 percent sulfur.

*Example 9*

The sodium salt of p-methylphenyl-penicillin may also be prepared in the following manner:

A culture medium is prepared as shown in Example 8 except that in place of the 0.82 g. of N-(2-hydroxyethyl)- p-methylphenylacetamide there is employed 2.5 g. of p-methylphenethylamine. The sterile culture medium is placed in a 5 gallon bottle inoculated with a spore suspension of Penicillium mold, strain X1612. The growth of the mold and the isolation and purification of p-methylphenyl-penicillin are carried out according to the procedure described in Example 8.

The sodium salt of p-methylphenyl-penicillin thus obtained is identical with that obtained by the procedure described in Example 8.

*Example 10*

The sodium salt of p-nitrophenyl-penicillin represented by the formula

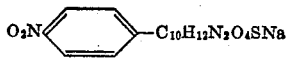

may be prepared in the following manner:

A culture medium may be prepared in the following proportions:

Lactose _____ g__ 125
Corn steep solids_____ g__ 100
Calcium carbonate_____ g__ 10
N-p-nitrophenylacetylvaline _____ g__ 1.05
Water _____ cc__ 5,000

The culture medium is distributed in 200 cc. portions in 1 liter Erlenmeyer flasks, sterilized, inoculated with a spore suspension of Penicillium mold, strain N. R. R. L. 1976, and stoppered with cotton plugs. The flasks are maintained at a temperature of about 23–26° C. and shaken constantly for five days. The flask contents are then filtered to remove the mold mycelium, the filtrate cooled to about 0° C., acidified to about pH 2.2 with orthophosphoric acid and extracted with about 60 percent of its volume of amyl acetate. The amyl acetate layer is separated and extracted with three 100 cc. portions of cold water to which cold N/10 sodium bicarbonate solution is added during the course of each extraction until a pH of about 7.1 to 7.3 is attained in the aqueous phase. The aqueous extracts are combined, cooled to about 0° C., acidified to about pH 2.2 with orthophosphoric acid and extracted with three 100 cc. portions of ether. The ether extracts are combined, and are passed through a chromatographic type silica adsorption column about 35 mm. in diameter and 300 mm. long and which contains a pH 6.2 phosphate buffer. The silica column is developed by percolation with six 100 cc. portions of ether containing successively increasing amounts of methanol in the order of ½, 1, 1½, 2, 2½ and 3 percent.

The developed silica column is divided into about 12 equal sections and each section is eluted with three 30 cc. portions of M/15 phosphate buffer of pH 7.0. The eluates are assayed bacteriologically to determine their penicillin content. About 38 percent of the total antibiotic activity possessed by all the eluates originates in a single band in the silica column and results from the presence of p-nitrophenyl-penicillin. This band occupies a position just above that in which penicillin F is found in comparable columns. The eluates obtained from the silica gel sections which make up this uniform band are combined, cooled to about 0° C., acidified to about pH 2.2 with orthophosphoric acid and extracted with three 50 cc. portions of chloroform. The combined chloroform extracts are passed through a silica adsorption column containing a pH 6.2 phosphate buffer. This silica gel column is developed by percolation with three 100 cc. portions of chloroform containing successively increasing amounts of methanol in the order of 1, 2 and 3 percent. The developed silica column is then divided into 12 equal sections and each section is eluted with three 30 cc. portions of M/15 phosphate buffer of pH 7.0. Bacteriological assay of the eluates shows that 100 percent of the total antibiotic activity originates in a single band in the silica column. The eluates obtained by extraction of the silica column sections which comprise this band are combined, cooled to about 0° C., acidified to about pH 2.2 and extracted with three 100 cc. portions of ether. The ether extracts are combined and extracted with about 75 cc. of cold water to which N/10 sodium bicarbonate solution is added during the course of the extraction so that a final pH of about 7.0 is obtained in the aqueous phase. From this aqueous solution the sodium salt of p-nitrophenyl-penicillin may be separated by any suitable means, for example, by freezing and evaporation in vacuo from the frozen state.

The dry amorphous sodium salt of p-nitrophenyl-penicillin is treated with 2 cc. of absolute acetone in which it almost completely dissolves, but from which it precipitates in crystalline form upon standing about two hours. The mixture is centrifuged and the solid washed with several portions of absolute acetone. The salt is redissolved in 1.6 cc. of 90 percent aqueous acetone and reprecipitated by the addition of 6 cc. of absolute acetone. A further recrystallization is effected by solution of the salt in 0.3 cc. of 90 percent acetone followed by the addition of a total of 3 cc. of absolute acetone added in portions over a period of about four hours.

The sodium salt of p-nitrophenyl-penicillin prepared according to the above procedure assayed about 1640 Oxford units per milligram when tested against Staph. aureus, strain 209P. A differential assay carried out on Staph. aureus, strain 209P, and B. subtilis, strain N. R. R. L. B-558, gave a value of about 0.84. The ultraviolet absorption spectrum showed a characteristic peak at about 270 m$\mu$ indicative of the presence of the p-nitrophenyl group.

*Example 11*

The sodium salt of p-nitrophenyl-penicillin may also be prepared in the following manner:

A culture medium is prepared as shown in Example 10 except that in place of the 1.05 g. of N-p-nitrophenyl-acetylvaline there is employed 1.05 g. of N-p-nitrophenyl-acetylisoleucine. The culture medium may then be treated substantially according to the procedure described in Example 10, and the penicillin produced in the culture medium may be isolated by the procedure substantially as described in Example 10.

The sodium salt of p-nitrophenyl-penicillin thus prepared is identical to p-nitrophenyl-penicillin sodium salt prepared according to the procedure described in Example 10.

*Example 12*

The sodium salt of p-fluorophenyl-penicillin represented by the formula

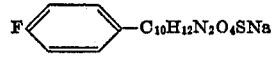

may be prepared in the following manner:

A culture medium may be prepared in the following proportions:

| | | |
|---|---|---|
| Lactose | g | 125 |
| Corn steep solids | g | 100 |
| Calcium carbonate | g | 10 |
| N-(2-hydroxylethyl) - p-fluorophenylacetamide | g | 0.72 |
| Water | cc | 5,000 |

The culture medium is distributed in 200 cc. portions in 1 liter Erlenmeyer flasks, sterilized, inoculated with a spore suspension of Penicillium mold, strain N. R. R. L. 1976, and stoppered with cotton plugs. The flasks are maintained at a temperature of about 23–26° C. and shaken constantly for five days. The flask contents are then filtered to remove the mold mycelium, the filtrate cooled to about 0° C., acidified to about pH 2.2 with orthophosphric acid and extracted with an equal volume of amyl acetate. The amyl acetate layer is separated and extracted with three 100 cc. portions of cold water to which cold N/10 sodium bicarbonate solution is added during the course of each extraction until a pH of about 7.1 to 7.3 is attained in the aqueous phase. The aqueous extracts are combined, cooled to about 0° C., acidified to about pH 2.2 with orthophosphoric acid and extracted with three 100 cc. portions of ether. The ether extracts are combined, and are passed through a chromatographic type silica adsorption column about 30 mm. in diameter and 300 mm. long and containing a pH 6.2 phosphate buffer. The silica column is developed by percolation with six 100 cc. portions of ether containing successively increasing amounts of methanol in the order of ½, 1, 1½, 2, 2½ and 3 percent.

The developed silica column is divided into about 12 equal sections and each section is eluted with three 30 cc. portions of M/15 phosphate buffer of pH 7.0. The eluates are assayed bacteriologically to determine their penicillin content. Practically all of the total antibiotic activity possessed by all the eluates originates in a single band in the silica column and arises from the presence of p-fluorophenyl-penicillin. The eluates obtained from the silica gel sections which make up this uniform band are combined, cooled to about 0° C., acidified to about pH 2.2 with orthophosphoric acid and extracted with three 50 cc. portions of chloroform. The combined chloroform extracts are passed through a silica adsorption column containing a pH 6.2 phosphate buffer. This silica gel column is developed by percolation with three 100 cc. portions of chloroform containing successively increasing amounts of methanol in the order of 1, 2 and 3 percent. The developed silica column is then divided into 12 equal sections and each section is eluted with three 30 cc. portions of M/15 phosphate buffer of pH 7.0. Bacteriological assay of the eluates shows that almost 100 percent of the total antibiotic activity originates in a single band in the silica column. The eluates obtained by extraction of the silica column sections which comprise this band are combined, cooled to about 0° C., acidified to about pH 2.2 with orthophosphoric acid and extracted with three 100 cc. portions of ether. The ether extracts are combined and extracted with about 75 cc. of a cold dilute aqueous solution of sodium hydroxide to which N/10 sodium hydroxide solution is added during the course of the extraction so that a final pH of about 7.0 is obtained in the aqueous phase. From this aqueous solution the sodium salt of p-fluorophenyl-penicillin may be separated by any suitable means, for example by freezing and evaporation in vacuo from the frozen state.

The resulting dry sodium salt of p-fluorophenyl-penicillin is washed with several portions of anhydrous acetone. It may be crystallized by dissolving it in 0.4 cc. of 90 percent aqueous acetone followed by the addition of 1.5 cc. of anhydrous acetone.

The sodium salt of p-fluorophenyl-penicillin assayed about 1770 Oxford units per mg. when tested against Staph. aureus, strain 209P. A differential assay when carried out on Staph. aureus, strain 209P, and B. subtilis, strain N. R. R. L. B–558, gave a value of about 0.89. Analysis of a sample of p-fluorophenyl-penicillin showed the presence of 51.27 percent carbon, 4.15 percent hydrogen, 7.49 percent nitrogen and 8.43 percent sulfur as compared with the calculated values of 51.33 percent carbon, 4.31 percent hydrogen, 7.47 percent nitrogen and 8.56 percent sulfur.

*Example 13*

The sodium salt of p-fluorophenyl-penicillin may also be prepared in the following manner:

A culture medium may be prepared in the following proportions:

| | | |
|---|---|---|
| Lactose | g | 125 |
| Corn steep solids | g | 150 |
| Calcium carbonate | g | 25 |
| p-Fluorophenethylamine | g | 2.0 |
| Water | cc | 5,000 |

The sterile culture medium is placed in a 5 gallon bottle equipped with a stirrer and an air inlet tube fitted with an air filter. The culture medium is inoculated with a spore suspension of Penicillium mold, strain X1612. The bottle contents are maintained at a temperature of about 23-26° C., and are stirred continuously for five days. Throughout this time air is continuously passed through the air inlet tube. The mold mycelium is then removed from the aqueous culture medium by filtration. The desired p-fluorophenyl-penicillin may be isolated and purified by substantially the same procedure as described in Example 12.

The sodium salt of p-fluorophenyl-penicillin thus prepared is identical with p-fluorophenyl-penicillin sodium salt prepared according to the procedure described in Example 12.

Example 14

The sodium salt of o-fluorophenyl-penicillin represented by the formula

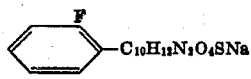

may be prepared in the following manner:

A culture medium may be prepared in the following proportions:

| | |
|---|---|
| Lactose _____g__ | 125 |
| Corn steep solids_____g__ | 100 |
| Calcium carbonate _____g__ | 10 |
| N-(2-hydroxyethyl) - o - fluorophenylacetamide _____g__ | 0.78 |
| Water _____cc__ | 5,000 |

The sterile culture medium is inoculated with mold spores and subsequent mold growth and isolation of o-fluorophenyl-penicillin is effected by substantially the same procedure as described in Example 12.

The dry amorphous sodium salt of o-fluorophenyl-penicillin is recrystallized by solution in 1½ cc. of 90 percent aqueous acetone followed by the addition of 2½ cc. of absolute acetone which is added slowly and with shaking. Recrystallization may be effected by dissolving the penicillin in 90 percent aqueous acetone and precipitation with absolute acetone.

A sample of the sodium salt of o-fluorophenyl-penicillin was found to possess a value of about 1340 Oxford units per milligram when tested against Staph. aureus, strain 209P. A differential assay carried out on Staph. aureus, strain 209P, and B. subtilis, strain N. R. R. L. B-558, gave a value of about 1.1. Analysis showed the presence of 51.93 percent carbon, 4.59 percent hydrogen, 7.81 percent nitrogen and 8.09 percent sulfur as compared with the calculated values of 51.33 percent carbon, 4.29 percent hydrogen, 7.49 percent nitrogen, and 8.56 percent sulfur.

Example 15

The sodium salt of m-fluorophenyl-penicillin represented by the formula

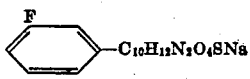

may be prepared in the following manner:

A culture medium may be prepared in the following proportions:

| | |
|---|---|
| Lactose _____g__ | 125 |
| Corn steep solids_____g__ | 100 |
| Calcium carbonate _____g__ | 10 |
| N-(2 - hydroxyethyl)-m-fluorophenylacetamide _____g__ | 0.78 |
| Water _____cc__ | 5,000 |

The sterile culture medium is inoculated with mold spores, and subsequent mold growth and isolation of m-fluorophenyl-penicillin is effected by substantially the same procedure as described in Example 12.

The dry amorphous sodium salt of m-fluorophenyl-penicillin may be recrystallized and purified by solution in 90 percent aqueous acetone followed by precipitation with absolute acetone.

A sample of the sodium salt of m-fluorophenyl-penicillin was found to possess a value of about 2340 Oxford units per milligram when tested against Staph. aureus, strain 209P. A differential assay carried out on Staph. aureus, strain 209P, and B. subtilis, strain N. R. R. L. B-558, gave a value of about 0.76. Analysis showed the presence of 51.47 percent carbon, 4.19 percent hydrogen, 7.61 percent nitrogen and 8.21 percent sulfur as compared with the calculated values of 51.33 percent carbon, 4.31 percent hydrogen, 7.49 percent nitrogen and 8.56 percent sulfur.

Example 16

The sodium salt of p-bromophenyl-penicillin represented by the formula

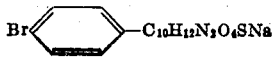

may be prepared in the following manner:

A culture medium may be prepared in the following proportions:

| | |
|---|---|
| Lactose _____g__ | 125 |
| Corn steep solids_____g__ | 100 |
| Calcium carbonate _____g__ | 10 |
| N-γ-(p-bromophenyl)-butyryl-dl-valine _____g__ | 1.2 |
| Water _____cc__ | 5,000 |

The culture medium is distributed in 200 cc. portions in 1 liter Erlenmeyer flasks, sterilized, inoculated with a spore suspension of Penicillium mold, strain N. R. R. L. 1976, and stoppered with cotton plugs. The flasks are maintained at a temperature of about 23-26° C. and shaken constantly for five days. The flask contents are then filtered to remove the mold mycelium, the filtrate cooled to about 0° C., acidified to about pH 2.2 with orthophosphoric acid and extracted with an equal volume of amyl acetate. The amyl acetate layer is separated and extracted with three 100 cc. portions of cold water to which cold N/10 sodium bicarbonate solution is added during the course of each extraction until a pH of about 7.1 to 7.3 is attained in the aqueous phase. The aqueous extracts are combined, cooled to about 0° C., acidified to about pH 2.2 with orthophosphoric acid and extracted with three 100 cc. portions of ether. The ether extracts are combined and are passed through a chromatographic type silica adsorption column about 30 mm. in diameter and 300 mm. long and containing a pH 6.2 phosphate buffer. The silica column is developed by percolation with six 100 cc. portions of ether containing successively increasing amounts of methanol in the order of ½, 1, 1½, 2, 2½ and 3 percent.

The developed silica column is divided into about 12 equal sections and each section is eluted with three 30 cc. portions of M/15 phosphate buffer of pH 7.0. The eluates are assayed bacteriologically to determine their penicillin content. 100 percent of the total antibiotic activity possessed by all the eluates originates in a single band in the silica column and arises from the presence of p-bromophenyl-penicillin. This band occupies a position slightly below that in which penicillin G is found in comparable columns. The eluates obtained from the silica gel sections which make up this uniform band are combined, cooled to about 0° C., acidified to about pH 2.2 and extracted with three 50 cc. portions of chloroform. The combined chloroform extracts are passed through a silica adsorption column similar to that used before. This silica gel column is developed by percolation with three 100 cc. portions of chloroform containing successively increasing amounts of methanol in the order of 1, 2 and 3 percent. The developed silica column is then divided into 12 equal sections and each section is eluted with three 30 cc. portions of M/15 phosphate buffer of pH 7.0. Bacteriological assay of the eluates shows that about 100 percent of the total antibiotic activity originates in a single band in the silica column. The eluates obtained by extraction of the silica column sections which comprise this band are combined, cooled to about 0° C., acidified to about pH 2.2 with orthophosphoric acid and extracted with three 100 cc. portions of ether. The ether extracts are combined and extracted with about 75 cc. of a cold dilute aqueous solution of sodium hydroxide to which N/10 sodium hydroxide solution is added during the course of the extraction so that a final pH of about 7.0 is obtained in the aqueous phase. From this aqueous solution the sodium salt of p-bromophenyl-penicillin may be separated by any suitable means, for example, by freezing and evaporation in vacuo from the frozen state.

The dry sodium salt of p-bromophenyl-penicillin is treated with 2 cc. of absolute acetone from which the crystalline salt separates after standing for about one hour. The salt may be recrystallized by treatment of a solution of the salt in 90 percent aqueous acetone with an excess of absolute acetone.

The sodium salt of p-bromophenyl-penicillin assayed about 2460 Oxford units per mg. when tested against *Staph. aureus*, strain 209P. A differential assay carried out on *Staph. aureus*, strain 209P, and *B. subtilis*, strain N. R. R. L. B–558, gave a value of about 0.65. Analysis showed the presence of 44.36 percent carbon, 3.93 percent hydrogen, 6.55 percent nitrogen and 16.91 percent bromine as compared with the calculated values of 44.14 percent carbon, 3.71 percent hydrogen, 6.05 percent nitrogen and 17.25 percent bromine.

*Example 17*

The sodium salt of p-bromophenyl-penicillin may also be prepared in the following manner:

A culture medium may be prepared in the following proportions:

| | | |
|---|---|---|
| Lactose | g | 125 |
| Corn steep solids | g | 150 |
| Calcium carbonate | g | 25 |
| β-p-Bromophenethanol | g | 1.0 |
| Water | cc | 5,000 |

The sterile culture medium is inoculated with mold spores and mold growth and isolation and purification of p-bromophenyl-penicillin are carried out by substantially the same procedure as described in Example 16.

The sodium salt of p-bromophenyl-penicillin thus prepared is identical with p-bromophenyl-penicillin sodium salt prepared according to the procedure described in Example 16.

*Example 18*

The sodium salt of phenoxy-penicillin represented by the formula

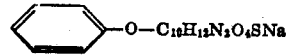

may be prepared in the following manner:

A culture medium may be prepared in the following proportions:

| | | |
|---|---|---|
| Lactose | g | 125 |
| Corn steep solids | g | 150 |
| Calcium carbonate | g | 25 |
| N-(2-hydroxyethyl)-phenoxyacetamide | g | 0.78 |
| Water | cc | 5,000 |

The culture medium is distributed in 200 cc. portions in 1 liter Erlenmeyer flasks, sterilized, inoculated with a spore suspension of Penicillium mold, strain N. R. R. L. 1976, and stoppered with cotton plugs. Growth of the mold and isolation of the sodium salt of the phenoxy-penicillin may be effected by the procedure described in Example 1.

The sodium salt thus obtained is purified by dissolving it in 2 cc. of absolute acetone from which upon standing it separates in crystalline form. It is separated by centrifugation and washed with small portions of absolute acetone. It is then dissolved in about 3 cc. of 85 percent aqueous acetone, the solution filtered and 4 cc. of absolute acetone added to the filtrate whereupon the pure crystalline material separates. The salt is recrystallized by dissolving it in about 3 cc. of 85 percent aqueous acetone followed by the addition of about 7 cc. of absolute acetone.

The sodium salt of phenoxy-penicillin assayed about 1660 Oxford units per milligram when tested against *Staph. aureus*, strain 209P. A differential assay when carried out on *Staph. aureus*, strain 209P, and *B. subtilis*, strain N. R. R. L. B–558, gave a value of about 0.87. Analysis showed the presence of 51.17 percent carbon, 4.49 percent hydrogen, 7.59 percent nitrogen and 8.50 percent sulfur as compared with the calculated values of 51.34 percent carbon, 4.60 percent hydrogen, 7.55 percent nitrogen and 8.61 percent sulfur.

*Example 19*

The sodium salt of phenoxy-penicillin may also be prepared as follows:

The culture medium as described in Example 18 is inoculated with Penicillium mold, strain X1612, and growth of the mold is effected in a five gallon bottle equipped with a stirrer and an air inlet tube fitted with an air filter as described in Example 8. The isolation and purification is effected according to the procedure described in Example 18.

The sodium salt of phenoxy-penicillin thus prepared is identical with phenoxy-penicillin sodium salt prepared according to the procedure described in Example 18.

*Example 20*

The sodium salt of p-iodophenyl-penicillin represented by the formula

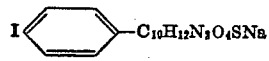

may be prepared in the following manner:

A culture medium may be prepared in the following proportions:

| | | |
|---|---|---|
| Lactose | g | 125 |
| Corn steep solids | g | 100 |
| Calcium carbonate | g | 10 |
| N-(2-hydroxyethyl) p-iodophenylacetamide | g | 1.2 |
| Water | cc | 5,000 |

The culture medium is distributed in 200 cc. portions in 1 liter Erlenmeyer flasks, sterilized, inoculated with a spore suspension of Penicillium mold, strain X1612, and stoppered with cotton plugs. The flasks are maintained at a temperature of about 23–26° C. and shaken constantly for five days. The flasks' contents are then filtered to remove the mold mycelium. The p-iodophenyl-penicillin present in the filtrate may be isolated according to the procedure described in Example 1.

The dry amorphous sodium salt of p-iodophenyl-penicillin obtained by evaporation of the aqueous solution of the sodium salt from the frozen state assayed about 2770 Oxford units per milligram when tested against Staph. aureus, strain 209P. A differential assay carried out on Staph. aureus, strain 209P, and B. Subtilis, strain N. R. R. L. B–558, gave a value of about 0.67.

*Example 21*

The sodium salt of p-tolylmercapto-penicillin represented by the formula

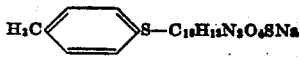

may be prepared in the following manner:

A culture medium may be prepared in the following proportions:

| | | |
|---|---|---|
| Lactose | g | 125 |
| Corn steep solids | g | 100 |
| Calcium carbonate | g | 10 |
| N-p-tolylmercaptoacetylvaline | g | 1.0 |
| Water | cc | 5,000 |

The culture medium is distributed in 100 cc. portions in 1 liter Erlenmeyer flasks, sterilized, inoculated with a spore suspension of Penicillium mold, strain X1612, and stoppered with cotton plugs. The flasks are maintained at a temperature of about 23–26° C. and shaken constantly for five days. The flasks' contents are then filtered to remove the mold mycelium. The p-tolylmercapto-penicillin present in the filtrate may be isolated according to the procedure described in Example 1.

The dry amorphous sodium salt of p-tolylmercapto-penicillin obtained by evaporation of the aqueous solution of the sodium salt from a frozen state is dissolved in 1.5 cc. of absolute acetone and the solution filtered to remove inorganic material. Upon addition of an excess of anhydrous ether to the filtrate, the sodium salt of p-tolylmercapto-penicillin is precipitated as an oil. The oil is treated with an equal volume of absolute acetone and allowed to stand in the refrigerator for about 12 hours. It is then transferred to a crystallizing dish and placed in a vacuum desiccator. After standing for some hours the salt crystallizes. The solid material is treated with 1 cc. of absolute acetone from which, upon standing at room temperature and with occasional scratching with a glass rod, the sodium salt separates in crystalline form.

The sodium salt of p-tolylmercapto-penicillin thus obtained assayed about 1285 Oxford units per milligram when tested against Staph. aureous, strain 209P. A differential assay carried out on Staph. aureous, strain 209P, and B. subtilis, strain N. R. R. L. B–558, gave a value of about 0.83.

*Example 22*

The sodium salt of cyclohexyl-penicillin represented by the formula

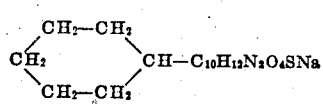

may be prepared in the following manner:

A culture medium may be prepared in the following proportions:

| | | |
|---|---|---|
| Lactose | g | 125 |
| Corn steep solids | g | 100 |
| Calcium carbonate | g | 10 |
| N-cyclohexylacetylvaline | g | 1.0 |
| Water | cc | 5,000 |

The culture medium is distributed in 200 cc. portions in 1 liter Erlenmeyer flasks, sterilized, inoculated with a spore suspension of Penicillium mold, strain N. R. R. L. 1976, and stoppered with cotton plugs. The growth of the mold and isolation of the cyclohexyl-penicillin as the sodium salt are carried out according to the procedure described in Example 1.

The sodium salt of cyclohexyl-penicillin thus obtained is crystallized and purified by dissolving it in 2 cc. of absolute acetone from which upon standing it separates in crystalline form. The crystalline sodium salt is isolated by centrifugation and washed with small portions of anhydrous acetone. It is dissolved in about 0.5 cc. of 92 per cent aqueous acetone, the solution is filtered and the filtrate is treated with 5 cc. of absolute acetone whereupon the crystalline sodium salt of cyclohexyl-penicillin precipitates. The sodium salt of cyclohexyl-penicillin prepared according to the above procedure assayed about 1700 Oxford units per milligram when tested against Staph. aureus, strain 209P. A differential assay carried out on Staph. aureous, strain 209P, and B. subtilis, strain N. R. R. L. B–558, gave a value of about 0.79.

Other examples of new penicillins produced substantially in accordance with the procedure described in the preceding examples are tabulated below together with the precursor compound used in the production of the penicillin and the differential assay value of the penicillin produced.

| Penicillin | Precursor Compound | Differential Assay Value |
|---|---|---|
| 3,4-dichlorophenyl-penicillin | N-(2'-hydroxyethyl)-3,4-dichlorophenyl-acetamide | 0.54 |
| o-bromophenyl-penicillin | N-(2-hydroxyethyl)-o-bromophenyl-acetamide | 0.62 |
| 5,6,7,8-tetrahydro-2-naphthylpenicillin | N-(2'-hydroxyethyl)-5,6,7,8-tetrahydro-2-naphthylacetamide | 0.73 |

Additional examples of new penicillins which may be produced in accordance with this invention are set forth below, together with the precursor compounds used in their production.

| Penicillin | Precursor Compound |
|---|---|
| ethylmercapto-penicillin | N-ethylmercaptoacetylvaline. |
| m-methoxyphenyl-penicillin | N-(2-hydroxyethyl)-m-methoxyphenylacetamide. |
| p-methoxyphenoxy-penicillin | N-(2-hydroxyethyl)-p-methoxyphenoxyacetamide. |
| m-trifluoromethylphenyl-penicillin | N-(2-hydroxyethyl)-m-trifluoromethylphenylacetamide. |
| p-benzyloxyphenyl-penicillin | N-p-benzyloxyphenylacetylvaline. |
| β-naphthoxy-penicillin | N-β-naphthoxyacetylvaline. |
| 6-fluoro-2-naphthyl-penicillin | N-(2'-hydroxyethyl)-6-fluoro-2-naphthylacetamide. |
| 6-bromo-2-naphthyl-penicillin | N-(2'-hydroxyethyl)-6-bromo-2-naphthylacetamide. |
| 2,4-dichlorophenyl-penicillin | N-(2'-hydroxyethyl)-2,4-dichlorophenylacetamide. |
| p-phenylmercaptophenyl-penicillin | N-(2-hydroxyethyl)-p-phenylmercaptophenylacetamide. |
| β-naphthylmercapto-penicillin | N-(2-hydroxyethyl)-β-naphthylmercaptoacetamide. |
| p-allyloxyphenyl-penicillin | N-(2-hydroxyethyl)-p-allyloxyphenylacetamide. |
| p-methylphenoxy-penicillin | N-(2-hydroxyethyl)-p-methylphenoxyacetamide. |
| m-trifluoromethylphenoxy-penicillin | N-(2-hydroxyethyl)-m-trifluoromethylphenoxyacetamide. |
| 3,4-dimethylphenyl-penicillin | N-(2'-hydroxyethyl)-3,4-dimethylphenylacetamide. |
| phenylmercaptomethyl-penicillin | N-β-phenylmercaptopropionylvaline. |
| m-hydroxyphenyl-penicillin | N-(2-hydroxyethyl)-m-hydroxyphenylacetamide. |
| p-aminophenyl-penicillin | N-(2-hydroxyethyl)-p-aminophenylacetamide. |
| styryl-penicillin | N-allylstyrylacetamide. |
| p-carbethoxyhydroxyphenyl-penicillin | N-p-carbethoxyhydroxyphenylacetylvaline. |
| 2-cyclopentenyl-penicillin | N-(2'-hydroxyethyl)-2-cyclopentene-1-acetamide. |
| β-naphthyl-penicillin | N-(2-hydroxyethyl)-β-naphthylacetamide. |
| o-chlorophenyl-penicillin | N-o-chlorophenylacetylvaline. |
| m-chlorophenyl-penicillin | N-(2-hydroxyethyl)-m-chlorophenylacetamide. |
| m-methylphenyl-penicillin | N-(2-hydroxyethyl)-m-methylphenylacetamide. |
| p-chlorophenoxy-penicillin | N-p-chlorophenoxyacetylvaline. |
| m-nitrophenyl-penicillin | N-m-nitrophenylacetylvaline. |
| p-methylmercaptophenyl-penicillin | N-(2-hydroxyethyl)-p-methylmercaptophenylacetamide. |
| m-bromophenyl-penicillin | N-(2-hydroxyethyl)-m-bromophenylacetamide. |
| 2,3-dimethoxyphenyl-penicillin | N-(2'-hydroxyethyl)-2,3-dimethoxyphenylacetamide. |
| 6-methoxy-2-naphthyl-penicillin | N-(2'-hydroxyethyl)-6-methoxy-2-naphthylacetamide. |
| 3,4-dibromophenyl-penicillin | N-(2'-hydroxyethyl)-3,4-dibromophenylacetamide. |
| 3-chloro-4-bromophenyl-penicillin | N-(2'-hydroxyethyl)-3-chloro-4-bromophenylacetamide. |
| p-phenoxyphenyl-penicillin | N-(2-hydroxyethyl)-p-phenoxyphenylacetamide. |
| p-cyanophenyl-penicillin | N-p-cyanophenylacetylvaline. |

For the purposes of convenience the preparations of certain novel compounds useful in carrying out this invention are given below:

*Preparation of N-(2-hydroxyethyl)-p-iodophenylacetamide*

N-(2-hydroxyethyl)-p-iodophenylacetamide represented by the following formula

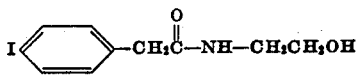

may be prepared in the following manner:

A mixture of 16 g. of methyl p-iodophenylacetate and 4.7 g. of ethanolamine are heated together at about 100° C. for about 12 hours. The reaction mixture is then dissolved in about 200 cc. of boiling ethyl acetate, treated with decolorizing carbon, filtered, and the filtrate evaporated to a volume of about 100 cc. Upon cooling the concentrated solution, preferably to a temperature below 5° C., N-(2-hydroxyethyl)-p-iodophenylacetamide precipitates in crystalline form. It is purified by recrystallization from a mixture of ethyl acetate and petroleum ether.

N-(2-hydroxyethyl)-p-iodophenylacetamide thus prepared melted at about 112-113° C. Analysis showed the presence of 39.32 percent carbon and 4.01 percent hydrogen as compared with the calculated values of 39.36 percent carbon and 3.97 percent hydrogen.

*Preparation of N-(2-hydroxyethyl)-p-methoxyphenylacetamide*

N-(2-hydroxyethyl)-p-methoxyphenylacetamide represented by the following formula

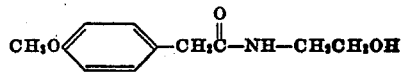

may be prepared in the following manner:

A mixture of 5.4 g. of methyl p-methoxyphenylacetate and 1.9 g. of ethanolamine is heated at about 140° C. for about 12 hours. The reaction mixture is dissolved in about 50 cc. of ether-petroleum ether mixture and the solution is partially evaporated to yield crystals of N-(2-hydroxyethyl)-p-methoxyphenylacetamide. The crystals are further purified by recrystallization from ethylene dichloride.

N-(2-hydroxyethyl)-p-methoxyphenylacetamide thus prepared melts at about 86-88° C. Analysis showed the presence of 6.64 percent nitrogen as compared with the calculated value of 6.69 percent.

*Preparation of N-(2-hydroxyethyl)-α-thienylacetamide*

N-(2-hydroxyethyl)-α-thienylacetamide represented by the following formula

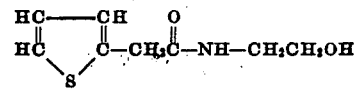

may be prepared in the following manner:

A mixture of 7.34 g. of methyl α-thienylacetate and 3.1 g. of ethanolamine is heated at about 135° C. for about 11 hours. The excess ethanolamine is then removed from the reaction mixture by heating the latter at about 90° C. under reduced pressure until all the ethanolamine is removed. N-(2-hydroxyethyl-α-thienylacetamide is obtained in crystalline form upon prolonged standing at room temperature.

N-(2-hydroxyethyl)-α-thienylacetamide thus prepared melted at about 66-67° C. Analysis showed the presence of 7.96 percent nitrogen as compared with the calculated value of 7.56 percent.

*Preparation of N-p-chlorophenylacetylvaline*

N-p-chlorophenylacetylvaline represented by the following formula

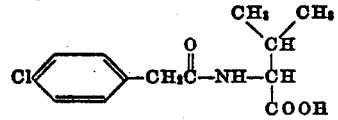

may be prepared in the following manner:

p-Chlorophenylacetyl chloride is prepared by treating 8.5 g. of p-chlorophenylacetic acid with 15 cc. of thionyl chloride, allowing the mixture to stand at room temperature for about 12 hours and then removing the excess thionyl chloride in vacuo. The resulting p-chlorophenylacetyl chloride is dissolved in about 30 cc. of anhydrous ether and the solution added in small portions and with stirring to a solution of 6.5 g. of valine dissolved in 110 cc. of 1 N sodium hydroxide. Stirring is continued for two hours after which time the aqueous layer is separated from the supernatant ether layer, acidified and cooled to about 0° C., whereupon N-p-chlorophenylacetylvaline is substantially completely precipitated. The N-p-chlorophenylacetylvaline is purified by recrystallization from aqueous alcohol.

N-p-chlorophenylacetylvaline thus prepared melted at about 144–145° C. Analysis showed the presence of 5.0 percent nitrogen as compared with the calculated value of 5.19 percent.

*Preparation of N-(2-hydroxyethyl)-o-fluorophenylacetamide*

N - (2-hydroxyethyl)-o-fluorophenylacetamide represented by the following formula

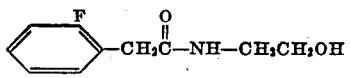

may be prepared in the following manner:

A mixture of 45 g. of ethyl o-fluorophenylacetate and 15.5 cc. of ethanolamine is heated at about 130° C. for about 12 hours. The reaction mixture is dissolved in 150 cc. of hot ethylene dichloride. Upon cooling to about 0° C. N-2-(hydroxyethyl)-o-fluorophenylacetamide separates in crystalline form.

N-(2-hydroxyethyl) - o-fluorophenylacetamide thus prepared melted at about 103–105° C. Analysis showed the presence of 7.09 percent nitrogen as compared with the calculated value of 7.10 percent.

*Preparation of N-(2-hydroxyethyl)-m-fluorophenylacetamide*

N - (2 - hydroxyethyl) - m - fluorophenylacetamide represented by the following formula

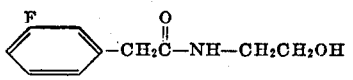

may be prepared from ethyl m-fluorophenylacetate and ethanolamine by substantially the same method as used in the preparation of N-(2-hydroxyethyl)-o-fluorophenylacetamide.

N - (2-hydroxyethyl) - m - fluorophenylacetamide thus prepared melted at about 75–77° C. Analysis showed the presence of 7.10 percent nitrogen as compared with the calculated value of 7.10 percent.

*Preparation of N-(2-hydroxyethyl)-p-fluorophenylacetamide*

N - (2-hydroxyethyl)-p-fluorophenylacetamide represented by the following formula

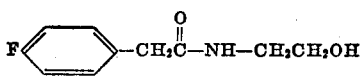

may be prepared from methyl p-fluorophenylacetate and ethanolamine by substantially the same method as used in the preparation of N-(2-hydroxyethyl)-o-fluorophenylacetamide.

N - (2-hydroxyethyl)-p-fluorophenylacetamide thus prepared melted at about 73–74° C. Analysis showed the presence of 7.03 percent nitrogen as compared with the calculated value of 7.10 percent.

*Preparation of N-(2-hydroxyethyl)-p-methylphenylacetamide*

N-(2-hydroxyethyl)-p-methylphenylacetamide represented by the formula

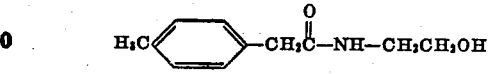

may be prepared from methyl p-methylphenylacetate and ethanolamine by substantially the same method as used in the preparation of N-(2-hydroxyethyl)-o-fluorophenylacetamide.

N-(2-hydroxyethyl)-p-methylphenylacetamide thus prepared melted at about 76–78° C. Analysis showed the presence of 7.28 percent nitrogen as compared with the calculated value of 7.25 percent.

*Preparation of N-γ-(p-bromophenyl)-butyrylvaline*

N - γ - (p - bromophenyl)-butyrylvaline represented by the following formula

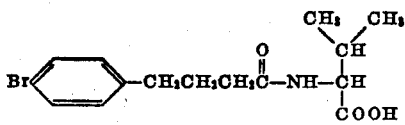

may be prepared in the following manner:

γ-(p-Bromophenyl)-butyryl chloride is prepared by reacting 23.5 g. of γ-p-bromophenylbutyric acid with 30 cc. of thionyl chloride at room temperature for about 15 hours. The excess thionyl chloride is removed in vacuo. The residue comprising γ-(p-bromophenyl)-butyryl chloride, is dissolved in about 60 cc. of ether and the solution is added in small portions and with stirring to a solution of 12 g. of valine dissolved in 200 cc. of 1 N sodium hydroxide. Stirring is continued for two hours after which period of time the aqueous layer is separated from the supernatant ether layer, acidified and cooled to about 0° C., whereupon N-γ-(p-bromophenyl)-butyrylvaline is substantially completely precipitated. It is purified by recrystallization from a mixture of methyl acetate and petroleum ether.

N-γ-(p-bromophenyl)-butyrylvaline thus prepared melted at about 134–135° C. Analysis showed the presence of 4.11 percent nitrogen as compared with the calculated value of 4.21 percent.

*Preparation of N-p-nitrophenylacetylvaline*

N-p-nitrophenylacetylvaline represented by the following formula

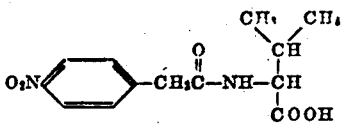

may be prepared by converting p-nitrophenylacetic acid to the corresponding acid chloride and reacting the latter with valine by substantially the same method as was used in the preparation of N-γ-p-bromophenylacetylvaline.

N - p - nitrophenylacetylvaline thus prepared melted at about 134–135° C. Analysis showed the presence of 10.15 percent nitrogen as compared with the calculated value of 10.0 percent nitrogen.

Preparation of N-p-nitrophenylacetylisoleucine

N-p-nitrophenylacetylisoleucine represented by the following formula

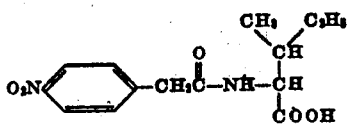

may be prepared in the following manner:

10 g. of p-nitrophenylacetyl chloride is dissolved in about 20 cc. of ether and the solution added to a solution of 8 g. of isoleucine dissolved in about 60 cc. of 6 N sodium hydroxide solution. The mixture is shaken for about 10 minutes and cooled to below 10° C. The aqueous layer is separated from the ether layer and acidified with dilute hydrochloric acid whereupon substantially all of the N-p-nitrophenylacetylisoleucine precipitates. It is purified by recrystallization from alcohol.

N-p-nitrophenylacetylisoleucine thus prepared melted at about 113–115° C. Analysis showed the presence of 9.65 percent nitrogen as compared with the calculated value of 9.65 percent nitrogen.

Preparation of N-(2-hydroxyethyl)-phenoxyacetamide

N-(2-hydroxyethyl)-phenoxyacetamide represented by the following formula

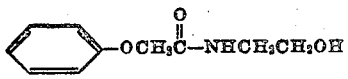

may be prepared in the following manner:

Methyl phenoxyacetate is prepared by esterification of phenoxyacetic acid with methyl alcohol and sulfuric acid. 4.65 g. of the methyl phenoxyacetate and 1.53 g. of ethanolamine are heated at 150° C. for about two hours. Excess ethanolamine is then removed by subjecting the reaction mixture to a vacuum while maintaining the temperature of the reaction mixture at about 150° C. Upon cooling the residue comprising N-(2-hydroxyethyl)-phenoxyacetamide crystallizes. It is purified by recrystallization from a mixture of ethyl acetate and petroleum ether.

N-(2-hydroxyethyl)-phenoxyacetamide thus prepared melted at about 45–48° C. Analysis showed the presence of 7.15 percent nitrogen as compared with the calculated value of 6.91 percent.

Preparation of N-allyl-β-chloropropionamide

N-allyl-β-chloropropionamide represented by the formula

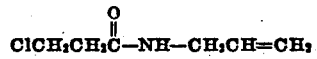

may be prepared by reacting 28 g. of β-cholopropionyl chloride and 12.6 g. of allylamine according to the procedure described in the preparation of N-p-nitrophenylacetylvaline. N-allyl-β-chloropropionamide thus prepared melted at about 39–40° C. Analysis showed the presence of 48.98 percent carbon, 6.67 percent hydrogen and 9.14 percent carbon as compared with the calculated values of 48.82 percent carbon, 6.83 percent hydrogen and 9.49 percent nitrogen.

Preparation of N-p-tolylmercaptoacetylvaline

N-p-tolylmercaptoacetylvaline represented by the formula

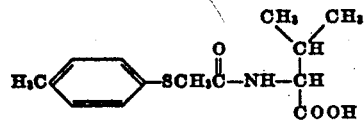

may be prepared as follows:

p-Tolylmercaptoacetic acid is prepared by heating a solution of 59 g. of p-thiocresol, 80 cc. of 12.5 N sodium hydroxide solution, 50.3 g. of chloroacetic acid and 1 liter of water for two hours at 80–90° C. The reaction mixture is then cooled and acidified with dilute hydrochloric acid whereupon the p-tolylmercaptoacetic acid is precipitated. It is purified by recrystallizing it from a mixture of ether and petroleum ether. p-Tolylmercaptoacetic acid thus prepared melted at about 85–86° C. Analysis showed the presence of 59.20 percent carbon and 5.19 percent hydrogen as compared with the calculated values of 59.31 percent carbon and 5.53 percent hydrogen.

3.64 g. of p-tolylmercaptoacetic acid is converted to the corresponding acid chloride by treatment with 20 cc. of thionyl chloride. The reaction mixture is maintained at room temperature for about 12 hours and the excess thionyl chloride is then removed in vacuo. The resulting p-tolylmercaptoacetyl chloride is converted to N-p-tolylmercaptoacetylvaline by reacting the acid chloride with 3.5 g. of valine according to the procedure described in the preparation of N-γ-(p-bromophenyl)-butyrylvaline. The N-p-tolylmercaptoacetylvaline is purified by recrystallization from a mixture of ethanol, ether and petroleum ether. N-p-tolylmercaptoacetylvaline thus prepared melted at about 136–138° C. Analysis showed the presence of 4.95 percent nitrogen as compared with a calculated value of 4.97 percent nitrogen.

Preparation of N-(2-hydroxyethyl)-o-bromophenlacetamide

N-(2-hydroxyethyl)-o-bromophenylacetamide represented by the formula

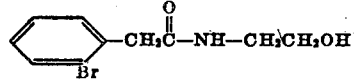

may be prepared by reacting 51 g. of ethyl o-bromophenylacetate and 15 g. of ethanolamine according to the method described in the preparation of N-(2-hydroxyethyl)-p-methoxyphenylacetamide. N-(2-hydroxyethyl)-o-bromophenylacetamide thus prepared and recrystallized from ethylene dichloride melted at about 106–107° C. Analysis showed the presence of 5.51 percent nitrogen as compared with the calculated value of 5.43 percent nitrogen.

Preparation of N-ethylmercaptoacetylvaline

N-ethylmercaptoacetylvaline represented by the formula

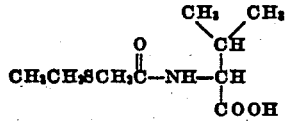

may be prepared as follows:

Ethylthioglycolic acid chloride is prepared by reacting 12 g. of ethylthioglycolic acid with 25 cc. of thionyl chloride at room temperature for about 12 hours. The excess thionyl chloride is then removed in vacuo and the resulting ethylthioglycolic acid chloride reacted with 15 g. of valine according to the method described in the preparation of N-γ-(p-bromophenyl)-butyrylvaline. N-ethylmercaptoacetylvaline thus prepared melted at about 85–86° C. Analysis showed the presence of 6.33 percent nitrogen as compared with the calculated value of 6.38 percent nitrogen.

*Preparation of N-(2'-hydroxyethyl)-3,4-dichlorophenylacetamide*

N-(2'-hydroxyethyl)-3,4-dichlorophenylacetamide represented by the formula

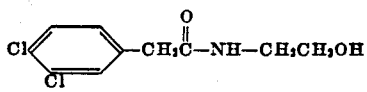

may be prepared as follows:

161 g. of 3,4-dichlorotoluene is heated to 150–160° C. and 160 g. of bromine added slowly. The resulting 3,4-dichlorobenzyl bromide is mixed with 70 g. of potassium cyanide, 400 cc. of ethanol and 1000 cc. of water and the mixture refluxed with stirring for about five hours. The alcohol is removed from the reaction mixture in vacuo and the oily layer of 3,4-dichlorobenzonitrile is separated and hydrolyzed by refluxing with a mixture of 400 cc. of concentrated sulfuric acid and 300 cc. of water. The reaction mixture is cooled whereupon the 3,4-dichlorophenylacetic acid formed during the hydrolysis precipitates. The precipitate is dissolved in dilute sodium hydroxide solution, the solution filtered and the filtrate acidified with dilute hydrochloric acid whereupon the 3,4-dichlorophenylacetic acid is precipitated. The acid is then esterified by refluxing it with 600 cc. of absolute ethanol and 10 cc. of concentrated sulfuric acid for about 4 hours. The bulk of the alcohol is removed in vacuo and the residue poured into cold water. The layer of ethyl 3,4-dichlorophenylacetate is separated and the ester purified by distillation in vacuo. Ethyl 3,4-dichlorophenylacetate thus prepared boiled at 112–115° C. at 0.2 mm. pressure. Analysis showed the presence of 51.78 percent carbon and 4.42 percent hydrogen as compared with the calculated values of 51.50 percent carbon and 4.32 percent hydrogen.

45 g. of ethyl 3,4-dichlorophenylacetate and 13 g. of ethanolamine are heated at about 125° C. for 15 hours. The reaction mixture is then heated in vacuo to remove the excess ethanolamine. The residue of N-(2'-hydroxyethyl)-3,4-dichlorophenylacetamide is recrystallized from ethylene dichloride. N-(2'-hydroxyethyl)-3,4-dichlorophenylacetamide thus prepared melted at about 113–114° C. Analysis showed the presence of 5.79 percent nitrogen as compared with the calculated value of 5.64 percent nitrogen.

*Preparation of N-(2'-hydroxyethyl)-5,6,7,8-tetrahydronaphthyl-2-acetamide*

N-(2'-hydroxyethyl)-5,6,7,8-tetrahydronaphthyl-2-acetamide represented by the formula

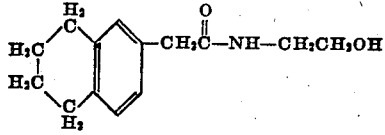

may be prepared as follows:

50 g. of 2-acetotetralin, 13 g. of sulfur and 40 cc. of morpholine are refluxed for about 15 hours. To the reaction mixture is then added a mixture of 400 cc. of concentrated hydrochloric acid and 300 cc. of water and refluxing is continued for 15 hours. The reaction mixture is then cooled, and extracted with ether. The ether extract is separated and is extracted with dilute sodium hydroxide solution. The extract of aqueous alkali is separated, acidified with dilute hydrochloric acid and cooled to about 0° C. whereupon 5,6,7,8-tetrahydro-2-naphthylacetic acid precipitates. The acid is separated and esterified by refluxing it with 600 cc. of absolute ethanol and 10 cc. of concentrated sulfuric acid for a period of about 5 hours. The bulk of the alcohol is then removed in vacuo and the residue is poured into cold water. The layer of ethyl 5,6,7,8-tetrahydro-2-naphthylacetate is separated and the ester purified by distillation in vacuo. Ethyl 5,6,7,8-tetrahydro-2-naphthylacetate thus prepared boiled at 140–143° C. at 0.5 mm. pressure. Analysis showed the presence of 76.84 percent carbon and 8.62 percent hydrogen as compared with the calculated values of 77.03 percent carbon and 8.31 percent hydrogen.

23 g. of ethyl 5,6,7,8-tetrahydro-2-naphthylacetate and 8 g. of ethanolamine are reacted at 125–130° C. for about 15 hours. The reaction mixture is then heated to about 150° C. in vacuo to remove the excess ethanolamine and the residue comprising N-(2'-hydroxyethyl)-5,6,7,8-tetrahydro-2-naphthylacetamide is purified by recrystallization from ethylene dichloride. N-(2'-hydroxyethyl)-5,6,7,8-tetrahydro-2-naphthylacetamide thus prepared melted at about 88–90° C. Analysis showed the presence of 6.19 percent nitrogen as compared with the calculated value of 6.00 percent nitrogen.

*Preparation of N-(2-hydroxyethyl)-m-methoxyphenylacetamide*

N-(2-hydroxyethyl)-m-methoxyphenylacetamide represented by the formula

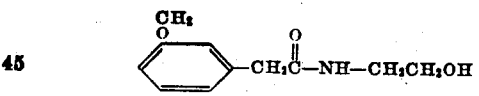

may be prepared from 47 g. of ethyl m-methoxyphenylacetate and 16 g. of ethanolamine according to the method described in the preparation of N-(2-hydroxyethyl)-p-methoxyphenylacetamide. N-(2-hydroxyethyl)-m-methoxyphenylacetamide thus prepared melted at about 58–59° C. Analysis showed the presence of 6.68 percent nitrogen as compared with a calculated value of 6.69 percent nitrogen.

*Preparation of N-(2-hydroxyethyl)-m-trifluoromethylphenylacetamide*

N-(2-hydroxyethyl)-m-trifluoromethylphenylacetamide represented by the formula

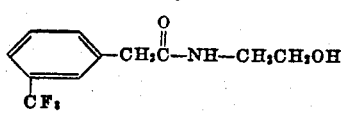

may be prepared as follows:

A solution of 80 g. of m-trifluoromethylaniline in a mixture of 115 cc. of concentrated hydrochloric acid and 400 cc. of water is cooled to about 5° C. and treated with 34 g. of sodium nitrite dissolved in water. The reaction mixture is poured slowly into a solution prepared from 135 g. of copper sulfate, 150 g. of potassium cyanide and 800 cc. of water and which is maintained at a temperature of from 70° to 80° C. and well agitated during the addition. The mixture is distilled with steam and the m-trifluoromethylbenzonitrile is separated from the aqueous distillate by extraction with ether. The ether extract is dried, the ether evaporated and the residue comprising m-trifluoromethylbenzonitrile is purified by distillation. m-Trifluoromethylbenzonitrile thus prepared exhibited a boiling point of about 188–190° C. at atmospheric pressure. Analysis showed the presence of 8.05 percent nitrogen as compared with a calculated value of 8.19 percent nitrogen.

51.5 g. of m-trifluoromethylbenzonitrile dissolved in 50 cc. of ether is added slowly to a solution of methylmagnesium iodide prepared from 60 g. of methyl iodide and 9 g. of magnesium in 400 cc. of ether. The reaction mixture is stirred for about 3 hours and is poured into a mixture of 500 g. of ice and 100 cc. of concentrated hydrochloric acid. The ether layer is separated from the aqueous layer, dried with anhydrous magnesium sulfate and the ether evaporated. The residue comprising m-trifluoromethylacetophenone is purified by distillation. m-Trifluoromethylacetophenon thus prepared has a boiling point of about 198–202° C. at atmospheric pressure. Analysis showed the presence of 57.20 percent carbon and 3.82 percent hydrogen as compared with the calculated values of 57.45 percent carbon and 3.75 percent hydrogen.

10 g. of m-trifluoromethylacetophenone, 2 g. of sulfur and 5.3 g. of morpholine are mixed and the mixture heated at about 135° C. for 16 hours. 30 cc. of glacial acetic acid and 30 cc. of concentrated hydrochloric acid are then added to the reaction mixture and the mixture refluxed for about 7 hours. The acetic acid is partially removed in vacuo and the residue is poured into 500 cc. of water and the aqueous mixture extracted with three 300 cc. portions of ether. The ether extracts are combined, and further extracted with a solution of 10 g. of sodium carbonate in 150 cc. of water. The alkaline extract is acidified with hydrochloric acid whereupon m-trifluoromethylphenylacetic acid precipitates as an oil which crystallizes on standing. It is purified by recrystallization from petroleum ether. m-Trifluoromethylphenylacetic acid thus prepared melted at about 72–73° C. Analysis showed the presence of 53.10 percent carbon and 3.38 percent hydrogen as compared with the calculated values of 52.95 percent carbon and 3.45 percent hydrogen.

19.5 g. of m-trifluoromethylphenylacetic acid are dissolved in 300 cc. of methanol containing 5 cc. of concentrated sulfuric acid and the mixture is refluxed for about 5 hours. The bulk of the methanol is removed in vacuo and the residue poured into cold water. The oily layer of methyl trifluoromethylphenylacetate is separated from the aqueous layer and purified by vacuum distillation. Methyl trifluoromethylphenylacetate thus prepared boiled at about 103° C. at 12 mm. pressure. Analysis showed the presence of 55.68 percent carbon and 4.26 percent hydrogen as compared with the calculated values of 55.05 percent carbon and 4.16 percent hydrogen.

8.2 g. of methyl m-trifluoromethylphenylacetate and 2.5 g. of ethanolamine are mixed and the mixture is heated to about 100° C. for 20 hours. The heating is then continued for two hours longer during which period the reaction mixture is subjected to vacuum to remove the excess ethanolamine. Analysis of N-(2-hydroxyethyl)-m-trifluoromethylphenylacetamide thus prepared showed the presence of 53.44 percent carbon and 5.28 percent hydrogen as compared with the calculated values of 53.44 percent carbon and 4.89 percent hydrogen.

*Preparation of N-(2'-hydroxyethyl)-6-methoxy-2-naphthylacetamide*

N-(2'-hydroxyethyl)-6-methoxy-2-naphthylacetamide represented by the formula

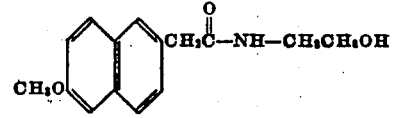

may be prepared in the following manner:

100 g. of 6-methoxy-2-acetonaphthone, 25.5 g. of sulfur and 87 g. of morpholine are heated at 135–140° C. for about 18 hours, and the excess morpholine is then removed in vacuo. The residue is treated with 250 cc. of glacial acetic acid and 350 cc. of concentrated hydrochloric acid and the mixture refluxed for about 24 hours. The mixture is then reduced to about ¼ of its volume by evaporation in vacuo and the residue treated with about 1 liter of water whereupon 6-methoxy-2-naphthylacetic acid precipitates. The 6-methoxy-2-naphthylacetic acid is separated by filtration and dissolved in a solution of 60 g. of sodium carbonate in 500 cc. of water. The solution is treated with decolorizing carbon, is filtered and the filtrate acidified with hydrochloric acid whereupon a precipitate of 6-methoxy-2-naphthylacetic acid is obtained and separated by filtration. The 6-methoxy-2-naphthylacetic acid is dried and dissolved in about 1 liter of ether, and the solution is treated with decolorizing carbon, filtered and the ether evaporated leaving the 6-methoxy-2-naphthylacetic acid as a crystalline residue. 6-Methoxy-2-naphthylacetic acid thus prepared melted at about 203–205° C. Analysis showed the presence of 71.74 percent carbon and 5.07 percent hydrogen as compared with the calculated values of 72.20 percent carbon and 5.60 percent hydrogen.

32.5 g. of 6-methoxy-2-naphthylacetic acid are dissolved in 500 cc. of methanol containing 5 cc. of concentrated sulfuric acid. The mixture is refluxed for about two hours and then evaporated to a small volume. The residue is diluted with water and the methyl 6-methoxy-2-naphthylacetate which separates as an oil is removed by extraction with ether. The ether extract is washed with dilute sodium carbonate solution, dried over anhydrous magnesium sulfate and the ether evaporated. The residue comprising methyl 6-methoxy-2-naphthylacetate is purified by vacuum distillation. Methyl 6-methoxy-2-naphthylacetate thus prepared boiled at about 192–193° C. at 1 mm. pressure and melted at about 86° C. Analysis showed the presence of 72.72 percent carbon and 6.12 percent hydrogen as compared with the calculated values of 73.03 percent carbon and 6.13 percent hydrogen.

N - (2'-hydroxyethyl)-6-methoxy-2-naphthylacetamide is prepared by reacting 11.5 g. of methyl 6-methoxy-2-naphthylacetate and 3.5 g. of ethanolamine according to the method used for the preparation of N-(2-hydroxyethyl)-p-iodophenylacetamide.

N - (2-hydroxyethyl)-6-methoxy-2-naphthylacetamide thus prepared melted at about 160° C. Analysis showed the presence of 68.95 percent carbon and 6.85 percent hydrogen as compared with the calculated values of 69.04 percent carbon and 6.61 percent hydrogen.

Preparation of N-(2'-hydroxyethyl)-6-fluoro-2-naphthylacetamide

N-(2'-hydroxyethyl) - 6 - fluoro-2-naphthyl-acetamide represented by the formula

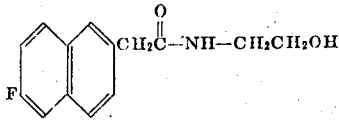

may be prepared as follows:

78 g. of 2-methyl-6-aminonaphthalene hydrochloride are mixed with 80 cc. of concentrated hydrochloric acid and 200 cc. of water. The mixture is cooled to about 5° C. and treated with stirring with a solution of 35 g. of sodium nitrite dissolved in 50 cc. of water. The resulting mixture is maintained at a temperature of about 5° C. for one half hour and there is then added thereto and with stirring about 130 g. of ice-cold 42 percent fluoroboric acid whereupon a precipitate of 2-methyl-6-naphthalene-diazonium fluoroborate is formed. The precipitate is removed by filtration and dried in a vacuum desiccator over sulfuric acid. The dried 2-ethyl-6-naphthalene-diazonium fluoroborate is placed in a distilling flask and heated locally with a small flame until a vigorous exothermic reaction results. After subsidence of the vigorous reaction, the reaction mixture is distilled in vacuum whereupon substantially pure 2-methyl-6-fluoronaphthalene is obtained. 2-methyl-6-fluoronaphthalene thus obtained melted at about 77° C. Analysis showed the presence of 82.53 percent carbon and 5.63 percent hydrogen as compared with the calculated values of 82.48 percent carbon and 5.66 percent hydrogen.

40 g. of 2-methyl-6-fluoronaphthalene are heated to about 210° C., and during illumination with a 100 watt lamp, 40 g. of bromine are added over a period of about 15 minutes. The reaction mixture comprising 2-bromomethyl - 6 - fluoronaphthalene is purified by distillation in vacuo. 2-bromomethyl - 6 - fluoronaphthalene thus prepared boiled at 125–130° C. at 2 mm. pressure and melted at about 53° C. Analysis showed the presence of 54.63 percent carbon and 3.15 percent hydrogen as compared with the calculated values of 55.26 percent carbon and 3.37 percent hydrogen.

48 g. of 2-bromomethyl-6-fluoronaphthalene are added slowly to a hot solution of 30 g. of potassium cyanide dissolved in a mixture of 60 cc. of water and 200 cc. of ethanol. The reaction mixture is refluxed for about four hours, 40 g. of potassium hydroxide are then added and refluxing is continued for five hours. The bulk of the alcohol is removed by evaporation in vacuo and 300 cc. of water are added to the residue. The resulting solution is treated with decolorizing carbon and filtered, and the filtrate acidified with hydrochloric acid whereupon 6-fluoro-2-naphthylacetic acid separates in crystalline form. 6-fluoro-2-naphthylacetic acid thus prepared melted at about 138–139° C. Analysis showed the presence of 70.68 percent carbon and 4.60 percent hydrogen as compared with the calculated values of 70.58 percent carbon and 4.44 percent hydrogen.

30 g. of 6-fluoro-2-naphthylacetic acid are dissolved in 300 cc. of methanol containing 10 cc. of concentrated sulfuric acid and the mixture is refluxed for about 15 hours. The bulk of the alcohol is then distilled from the reaction mixture and the residue diluted with cold water whereupon methyl 6-fluoro-2-naphthylacetate separates as an oily layer. The methyl ester is extracted with ether, the ether solution dried over anhydrous magnesium sulfate and the ether distilled. The residue comprising methyl 6-fluoro-2-naphthylacetate is purified by vacuum distillation. Methyl 6-fluoro-2-naphthylacetate thus prepared boiled at 163–166° C. at 2 mm. pressure and melted at about 48–49° C. Analysis showed the presence of 71.35 percent carbon and 5.25 percent hydrogen as compared with the calculated values of 71.55 percent carbon and 5.08 percent hydrogen.

11 g. of methyl 6-fluoro-2-naphthylacetate and 3.5 g. of ethanolamine are reacted according to the procedure described in the preparation of N-(2-hydroxyethyl)-p-iodophenylacetamide.

N-(2'-hydroxyethyl)-6-fluoro-2-naphthylacetamide thus prepared melted at about 145–146° C. Analysis showed the presence of 67.88 percent carbon and 5.60 percent hydrogen as compared with the calculated values of 68.00 percent carbon and 5.71 percent hydrogen.

Preparation of N-(2'-hydroxyethyl)-6-bromo-2-naphthylacetamide

N-(2'-hydroxyethyl)-6-bromo-2-naphthylacetamide represented by the formula

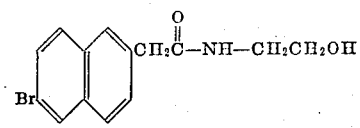

may be prepared in the following manner:

63 g. of 2-methyl-6-aminonaphthalene are added to a mixture of 700 g. of 48 percent hydrobromic acid and 100 cc. of water. The mixture is cooled to below 5° C. and during stirring a solution of 50 g. of sodium nitrite dissolved in 100 cc. of water is added over a period of about four hours. The reaction mixture is poured slowly into a hot solution of 170 g. of cuprous bromide dissolved in 800 cc. of 48 percent hydrobromic acid. The mixture is allowed to stand at room temperature for about 12 hours and is then steam distilled whereupon 2-methyl-6-bromonaphthalene is obtained in the distillate wherefrom it is separated by filtration. 2-methyl-6-bromonaphthalene thus prepared melted at about 142° C. Analysis showed the presence of 59.75 percent carbon and 4.07 percent hydrogen as compared with the calculated values of 59.75 percent carbon and 4.10 percent hydrogen.

2-methyl-6-bromonaphthalene is converted to 2-bromomethyl-6-bromonaphthalene according to the procedure described for the preparation of 2-bromomethyl-6-fluoronaphthalene. 2-bromomethyl-6-bromonapthalene thus prepared melted at about 124–125° C. Analysis showed the presence of 44.08 percent carbon and 2.64 percent hydrogen as compared with the calculated values at 44.04 percent carbon and 2.69 percent hydrogen.

2-bromomethyl-6-bromonaphthalene is converted into 6-bromo-2-naphthylacetic acid according to the procedure described for the preparation of 6-fluoro-2-naphthylacetic acid. 6-bromo-2-naphthylacetic acid thus prepared melted at about 175–176° C. Analysis showed the presence of 54.45 percent carbon and 3.30 percent hydrogen as compared with the calculated values of 54.36 percent carbon and 3.42 percent hydrogen.

Methyl 6-bromo-2-naphthylacetate is prepared according to the procedure described in the preparation of methyl 6-fluoro-2-naphthylacetate. Methyl 6-bromo-2-naphthylacetate thus prepared melted at about 67–69° C. Analysis showed the presence of 55.36 percent carbon and 3.61 percent hydrogen as compared with the calculated values of 55.93 percent carbon and 3.97 percent hydrogen.

Methyl 6-bromo-2-naphthylacetate is converted to N-(2'-hydroxyethyl)-6-bromo-2-naphthylacetamide according to the procedure described in the preparation of N-(2-hydroxyethyl)-p-iodophenylacetamide. N-(2'-hydroxyethyl)-6-bromo-2-naphthylacetamide thus prepared melted at about 167–168° C. Analysis showed the presence of 54.55 percent carbon and 4.58 percent hydrogen as compared with the calculated values of 54.56 percent carbon and 4.58 percent hydrogen.

*Preparation of N-(2-hydroxyethyl)-m-trifluoromethylphenoxyacetamide*

N-(2-hydroxyethyl) - m - trifluoromethylphenoxyacetamide represented by the formula

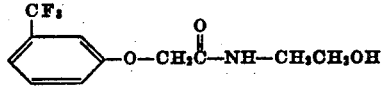

may be prepared in the following manner:

19 g. of m-trifluoromethylphenol and 19 cc. of 12.5 N sodium hydroxide solution are treated with 11 g. of chloroacetic acid. The mixture is heated at about 80–100° C. for about three hours. The reaction mixture is then diluted with 400 cc. of water, acidified with hydrochloric acid and the m-trifluoromethylphenoxyacetic acid which separates is extracted with ether. The ether extract is in turn extracted with a dilute aqueous solution of sodium bicarbonate. The sodium bicarbonate solution is acidified whereupon m-trifluoromethylphenoxyacetic acid is precipitated in solid form. m-Trifluoromethylphenoxyacetic acid thus prepared melted at about 92–93° C. Analysis showed the presence of 49.59 percent carbon and 3.26 percent hydrogen as compared with the calculated values of 49.10 percent carbon and 3.21 percent hydrogen.

m-Trifluoromethylphenoxyacetic acid is converted to methyl m-trifluoromethylphenoxyacetate according to the procedure described in the preparation of methyl 6-fluoro-2-naphthylacetate. Methyl m-trifluoromethylphenoxyacetate thus prepared boiled at about 101° C. at 3 mm. pressure. Analysis showed the presence of 51.01 percent carbon and 3.68 percent hydrogen as compared with the calculated values of 51.29 percent carbon and 3.87 percent hydrogen.

16.6 g. of methyl m-trifluoromethylphenoxyacetate and 5 g. of ethanolamine are treated according to the procedure described in the preparation of N-(2-hydroxyethyl)-p-iodophenylacetamide. N-(2-hydroxyethyl)-m-trifluoromethylphenoxyacetamide thus obtained melted at about 86° C. Analysis showed the presence of 5.44 percent nitrogen as compared with the calculated value of 5.32 percent nitrogen.

*Preparation of N-(2-hydroxyethyl)-p-methylphenoxyacetamide*

N-(2-hydroxyethyl)-p-methylphenoxyacetamide represented by the formula

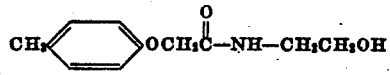

may be prepared in the following manner:

Methyl p-methylphenoxyacetate is prepared from p-methylphenoxyacetic acid according to the procedure described for the preparation of methyl 6-fluoro-2-naphthylacetate. Methyl p-methylphenoxyacetate thus prepared boiled at about 119° C. at 5 mm. pressure. Analysis showed the presence of 66.56 percent carbon and 6.85 percent hydrogen as compared with the calculated values of 66.65 percent carbon and 6.72 percent hydrogen.

10 g. of methyl p-methylphenoxyacetate are reacted with 3.5 g. of ethanolamine according to the procedure described in the preparation of N-(2-hydroxyethyl) - o - fluorophenylacetamide. N-(2-hydroxyethyl)-p-methylphenoxyacetamide thus prepared melted at about 89–90° C. Analysis showed the presence of 6.77 percent nitrogen as compared with the calculated value of 6.70 percent nitrogen.

*Preparation of N-(2'-hydroxyethyl)-2-cyclopentene-1-acetamide*

N-(2'-hydroxyethyl) - 2 - cyclopentene-1-acetamide represented by the formula

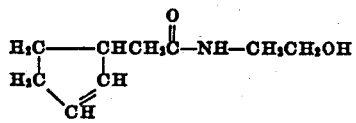

may be prepared in the following manner:

15 g. of diethyl 2-cyclopentenylmalonate, 15 g. of potassium hydroxide and 15 cc. of water are mixed and heated at about 100° C. for five hours. The reaction mixture is cooled and acidified with concentrated hydrochloric acid and the mixture extracted several times with ether. Evaporation of the ether leaves a residue of 2-cyclopentenylmalonic acid which is heated to about 160° C. whereupon decarboxylation occurs and 2-cyclopentene-1-acetic acid is formed. The 2-cyclopentene-1-acetic acid is dissolved in ether and treated with an ethereal solution of diazomethane. The ethereal solution is then shaken with dilute sodium bicarbonate solution, the ether solution separated and dried over anhydrous magnesium sulfate. Evaporation of the ether leaves a residue of methyl 2-cyclopentene-1-acetate.

10 g. of methyl 2-cyclopentene-1-acetate and 4.5 g. of ethanolamine are heated together at about 150° C. for four hours. The excess ethanolamine is removed from the reaction mixture by heating the mixture to about 150° C. in a vacuum for about three hours. The residue comprising N-(2'-hydroxyethyl)-2-cyclopentene-1-acetamide may be purified by dissolving it in ethyl acetate and reprecipitating it by the addition of petroleum ether. N-(2'-hydroxyethyl)-2-cyclopentene-1-acetamide thus prepared was obtained in the form of an oil. Analysis showed the presence of 8.7 percent nitrogen as compared with the calculated value of 8.3 percent nitrogen.

*Preparation of N-allyl-styrylacetamide*

N-allyl-styrylacetamide represented by the formula

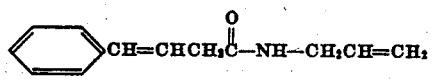

may be prepared by reacting 18 g. of styrylacetyl chloride and 11.4 g. of allylamine according to the procedure described in the preparation of N-γ-(p-bromophenyl)-butyrylvaline.

N-allyl-styrylacetamide thus prepared melted at about 61.5–63° C. Analysis showed the pres-

Preparation of N-p-carbethoxyhydroxyphenylacetylvaline

N - p - carbethoxyhydroxyphenylacetylvaline represented by the formula

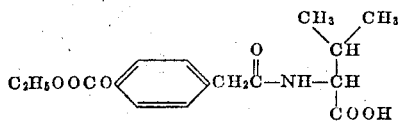

may be prepared in the following manner:

15.2 g. of p-hydroxyphenylacetic acid are dissolved in a mixture of 200 cc. of water and 48.4 cc. of a 4.14 N sodium hydroxide solution. To the solution are added 12 g. of ethyl chlorocarbonate. The mixture is stirred two hours and 32 cc. of 4 N hydrochloric acid is added and the precipitate of p-carbethoxyhydroxyphenylacetic acid which forms is separated by filtration and purified by recrystallization from a mixture of ether and petroleum ether. p-Carbethoxyhydroxyphenylacetic acid thus prepared melted at about 78–79° C. Analysis showed the presence of 58.90 percent carbon and 5.37 percent hydrogen as compared with the calculated values of 58.92 percent carbon and 5.32 percent hydrogen.

11.2 g. of p-carbethoxyhydroxyphenylacetic acid and 10.4 g. of phosphorus pentachloride are mixed whereupon a vigorous reaction results. The reaction mixture is allowed to stand at room temperature for about 15 hours and is then subjected to a vacuum to remove volatile material. The residue comprising p-carbethoxyhydroxyphenylacetyl chloride is dissolved in 50 cc. of ether and is added simultaneously with 50 cc. of 1 N sodium hydroxide solution to a solution of 6.43 g. of valine dissolved in 55 cc. of 1 N sodium hydroxide solution. The reaction mixture is stirred for one hour, the ether layer is separated and discarded and the aqueous layer is acidified to a pH of about 4 whereupon a precipitate of N-p-carbethoxyhydroxy-phenylacetylvaline separates. The precipitate is separated by filtration and recrystallized from a mixture of ethanol and ether. N-p-carbethoxyhydroxyphenylacetylvaline thus prepared melted at about 125–127° C. Analysis showed the presence of 4.50 percent nitrogen as compared with the calculated value of 4.33 percent nitrogen.

Preparation of N-(2-hydroxyethyl)-β-naphthylacetamide

N-(2-hydroxyethyl) - p - naphthylacetamide represted by the formula

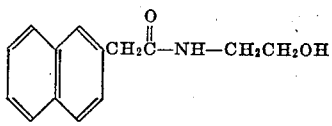

may be prepared by reacting 6.4 g. of ethyl β-naphthylacetate and 1.9 g. of ethanolamine according to the procedure described in the preparation of N-(2-hydroxyethyl)-o-fluorophenylacetamide.

N-(2-hydroxyethyl)-β-naphthylacetamide thus prepared melted at about 125-127° C. Analysis showed the presence of 6.20 percent nitrogen as compared with the calculated value of 6.11 percent nitrogen.

Preparation of N-o-chlorophenylacetylvaline

N-o-chlorophenylacetylvaline represented by the formula

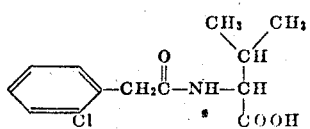

may be prepared by converting 8.5 g. of o-chlorophenylacetic acid to the corresponding acid chloride and reacting the latter with valine according to the procedure described in the preparation of N-p - chlorophenylacetylvaline. N - o - chlorophenylacetylvaline thus prepared melted at about 122–124° C. Analysis showed the presence of 4.80 percent nitrogen as compared with the calculated value of 5.19 percent nitrogen.

Preparation of N-(2-hydroxyethyl)-m-chlorophenylacetamide

N-(2-hydroxyethyl)-m-chlorophenylacetamide represented by the formula

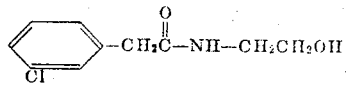

may be prepared by reacting 58 g. of ethyl m-chlorophenylacetate and 19 g. of ethanolamine according to the procedure described in the preparation of N-(2-hydroxylethyl)-o-fluorophenylacetamide.

N-(2-hydroxyethyl)-m-chlorophenylacetamide thus prepared melted at about 114–117° C. Analysis showed the presence of 6.54 percent nitrogen as compared with the calculated value of 6.55 percent nitrogen.

Preparation of N-(2-hydroxyethyl)-m-methylphenylacetamide

N-(2-hydroxyethyl)-m - methylphenylacetamide represented by the formula

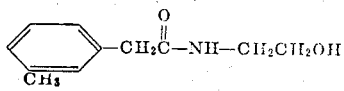

may be prepared by heating 8.9 g. of ethyl m-methylphenylacetate and 4 g. of ethanolamine at 135–140° C. for about 12 hours. The reaction mixture is then heated to about 80° C. and subjected to a vacuum of about 0.01 mm. for about 10 hours to remove volatile constituents.

N-(2-hydroxyethyl)-m - methylphenylacetamide thus prepared was an oil. Analysis showed the presence of 7.21 percent nitrogen as compared with the calculated value of 7.25 percent nitrogen.

Preparation of N-(2-hydroxyethyl)-p-xenylacetamide

N-(2-hydroxyethyl)-p-xenylacetamide represented by the formula

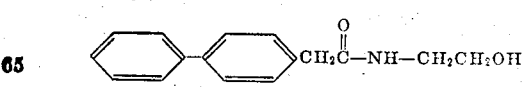

may be prepared as follows:

7 g. of p-xenylacetic acid are dissolved in 150 cc. of absolute ethanol containing 1 cc. of concentrated sulfuric acid. The solution is refluxed for about 12 hours and the bulk of the alcohol is evaporated in vacuo. The residue comprising ethyl p-xenylacetate is treated with dilute sodium hydroxide solution to neutralize the sulfuric acid present and the ethyl p-xenylacetate which separates from the aqueous layer as an oil is removed.

The crude ethyl p-xenylacetate is reacted with 2.4 g. of ethanolamine according to the procedure described in the preparation of N-(2-hydroxyethyl)-o-fluorophenylacetamide. N-(2-hydroxyethyl)-p-xenylacetamide thus prepared melted at about 172–175° C. Analysis showed the presence of 5.70 percent nitrogen as compared with the calculated value of 5.75 percent nitrogen.

*Preparation of N-m-nitrophenylacetylvaline*

N-m-nitrophenylacetylvaline represented by the formula

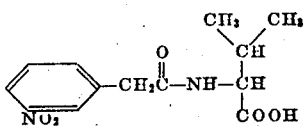

may be prepared in the following manner:

9 g. of m-nitrophenylacetic acid are converted to the corresponding acid chloride by dissolving the m-nitrophenylacetic acid in 30 cc. of chloroform and adding thereto 10.4 g. of phosphorus pentachloride. The reaction mixture is allowed to stand for about 4 hours and the volatile material is removed by subjecting the reaction mixture to vacuum. The residue comprising m-nitrophenylacetyl chloride is reacted with 6.0 g. of valine according to the procedure used in the preparation of N-γ-(p-bromophenyl)-butyrylvaline. N-m-nitrophenylacetylvaline thus prepared melted at about 153–158° C. Analysis showed the presence of 10.10 percent nitrogen as compared with the calculated value of 10.00 percent nitrogen.

*Preparation of N-(2-hydroxyethyl)-p-methylmercaptophenylacetamide*

N-(2-hydroxyethyl)-p-methylmercaptophenylacetamide represented by the formula

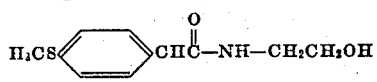

may be prepared in the following manner:

24.8 g. of thioanisole, 24 g. of acetyl chloride and 150 cc. of carbon bisulfide are cooled to about 0° C. and treated with small portions of anhydrous aluminum chloride until a total of 30 g. are used. The reaction mixture is stirred four hours and is then poured into a mixture of ice and hydrochloric acid. The carbon bisulfide is distilled from the reaction mixture and the aqueous residue is extracted with ether. The ether extract is dried over magnesium sulfate and evaporated leaving a solid residue of p-methylmercaptoacetophenone which is purified by recrystallization from a mixture of ether and petroleum ether. p-Methylmercaptoacetophenone thus prepared melted at about 72–75° C. Analysis showed the presence of 65.06 percent carbon and 5.96 percent hydrogen as compared with the calculated values of 65.02 percent carbon and 6.06 percent hydrogen.

49.8 g. of p-methylmercaptoacetophenone are converted to p-methylmercaptophenylacetic acid according to the procedure described for the conversion of 2-acetotetralin to 5,6,7,8-tetrahydro-2-naphthylacetic acid. p-Methylmercaptophenylacetic acid thus prepared melted at about 93–94° C. Analysis showed the presence of 59.71 percent carbon and 5.25 percent hydrogen as compared with the calculated values of 59.31 percent carbon and 5.53 percent hydrogen.

p-Methylmercaptophenylacetic acid is converted to the corresponding methyl ester by refluxing a solution of p-methylmercaptophenylacetic acid in methanol saturated with dry hydrogen chloride gas. The bulk of the alcohol is distilled from the reactive mixture and the residue poured into cold water. The oily layer of methyl p-methylmercaptophenylacetate which forms is separated and purified by distillation. Methyl p-methylmercaptophenylacetate thus prepared boiled at about 179–181° C. at 3 mm. pressure. Analysis showed the presence of 60.76 percent carbon and 6.13 percent hydrogen as compared with the calculated values of 61.19 percent carbon and 6.16 percent hydrogen.

18 g. of methyl p-methylmercaptophenylacetate and 6.5 g. of ethanolamine are reacted according to the procedure described in the preparation of N-(2-hydroxyethyl)-o-fluorophenylacetamide. N-(2-hydroxyethyl)-p-methylmercaptophenylacetamide thus prepared melted at about 115–117° C. Analysis showed the presence of 6.30 percent nitrogen as compared with the calculated value of 6.30 percent nitrogen.

*Preparation of N-(2-hydroxyethyl)-m-bromophenylacetamide*

N-(2-hydroxyethyl)-m-bromophenylacetamide represented by the formula

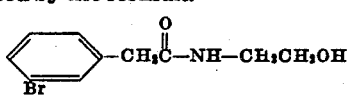

may be prepared by reacting 37 g. of ethyl m-bromophenylacetate and 11 g. of ethanolamine according to the procedure described in the preparation of N-(2-hydroxyethyl)-o-fluorophenylacetamide.

N-(2-hydroxyethyl)-m-bromophenylacetamide thus prepared melted at about 129–130° C. Analysis showed the presence of 5.37 percent nitrogen as compared with the calculated value of 5.43 percent nitrogen.

*Preparation of N-(2'-hydroxyethyl)-2,3-dimethoxyphenylacetamide*

N-(2'-hydroxyethyl)-2,3-dimethoxyphenylacetamide represented by the formula

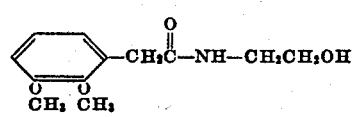

may be prepared by reacting 41 g. of methyl 2,3-dimethoxyphenylacetate and 14 g. of ethanolamine according to the procedure described in the preparation of N-(2-hydroxyethyl)-o-fluorophenylacetamide.

N-(2'-hydroxyethyl)-2,3-dimethoxyphenylacetamide thus prepared melted at about 93° C. Analysis showed the presence of 5.83 percent nitrogen as compared with the calculated value of 5.85 percent nitrogen.

*Preparation of N-(2-hydroxyethyl)-p-phenoxyphenylacetamide*

N-(2-hydroxyethyl)-p-phenoxyphenylacetamide represented by the formula

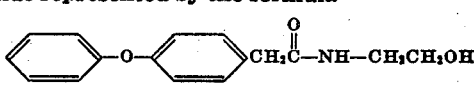

may be prepared in the following manner:

60 g. of p-phenoxyacetophenone, 13 g. of sulfur and 40 g. of morpholine are mixed and refluxed overnight. To the reaction mixture is added a solution of 75 g. of potassium hydroxide dissolved in 75 cc. of water and 600 cc. of ethanol, and the total mixture is refluxed for about 50 hours. The alcohol is then removed in vacuo, the residual aqueous solution extracted several times with ether and the aqueous solution acidified whereupon p-phenoxyphenylacetic acid precipitates as a solid. The p-phenoxyphenylacetic acid is dried and esterified with ethanol and sulfuric acid according to the procedure described for the preparation of ethyl 5,6,7,8-tetrahydro-2-naphthylacetate. Ethyl p-phenoxyphenylacetate thus prepared boiled at about 173–174° C. at 2 mm. pressure. Analysis showed the presence of 75.30 percent carbon and 6.45 percent hydrogen as compared with the calculated values of 74.97 percent carbon and 6.29 percent hydrogen.

22 g. of ethyl p-phenoxyphenylacetate and 6.5 g. of ethanolamine are reacted according to the procedure described in N-(2-hydroxyethyl)-o-fluorophenylacetamide. N-(2-hydroxyethyl) - p-phenoxyphenylacetamide thus prepared melted at about 95° C. Analysis showed the presence of 5.24 percent nitrogen as compared with the calculated value of 5.16 percent nitrogen.

*Preparation of N-p-cyanophenylacetylvaline*

N-p-cyanophenylacetylvaline represented by the formula

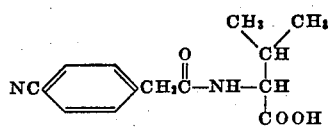

may be prepared by converting p-cyanophenylacetic acid to the corresponding acid chloride and reacting the p-cyanophenylacetyl chloride with valine according to the procedure described in the preparation of N-γ-(p-bromophenyl)-butyrylvaline.

N - p-cyanophenylacetylvaline thus prepared melted at about 138–140° C. Analysis showed the presence of 10.89 percent nitrogen as compared with the calculated value of 10.76 percent nitrogen.

*Preparation of N-p-benzyloxyphenylacetylvaline*

N - p-benzyloxyphenylacetylvaline represented by the formula

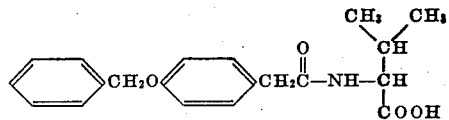

may be prepared in the following manner:

36 g. of ethyl p-hydroxyphenylacetate, 13.3 g. of sodium methoxide and 38 g. of benzyl chloride are dissolved in 300 cc. of absolute ethanol and the mixture is refluxed with stirring for about 15 hours. The alcohol is removed from the reaction mixture by evaporation in vacuo and about 300 cc. of water are added to the residue. Ethyl p-benzyloxyphenylacetate which separates as an oil is extracted with ether, the ether extract washed with dilute sodium hydroxide solution and the ether evaporated. The residue is added to a solution of 70 g. of potassium hydroxide dissolved in a mixture of 70 cc. of water and 400 cc. of ethanol and the mixture is refluxed for about 12 hours. The ethanol is removed from the reaction mixture by evaporation in vacuo and about 300 cc. of water are added to the residue. The aqueous solution is extracted with ether and the aqueous layer is then acidified with hydrochloric acid whereupon a precipitate of p-benzyloxyphenylacetic acid separates. The p-benzyloxyphenylacetic acid is separated by filtration, dried and purified by recrystallization from a mixture of benzene and petroleum ether. p-Benzyloxyphenylacetic acid thus prepared melted at about 120–121° C. Analysis showed the presence of 74.60 percent carbon and 5.61 percent hydrogen as compared with the calculated values of 74.36 percent carbon and 5.45 percent hydrogen.

p-Benzyloxyphenylacetic acid is converted to the corresponding acid chloride and the latter reacted with valine according to the procedure described in the preparation of N-γ-(p-bromophenyl)-butyrylvaline. N - p - benzyloxyphenylacetylvaline thus prepared melted at about 144–145° C. Analysis showed the presence of 4.19 percent nitrogen as compared with the calculated value of 4.10 percent nitrogen.

*Preparation of N-β-naphthoxyacetylvaline*

N-β-naphthoxyacetylvaline represented by the formula

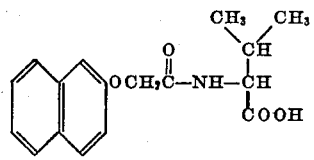

may be prepared by converting β-naphthoxyacetic acid to the corresponding acid chloride and reacting the β-naphthoxy-acetyl chloride with valine according to the procedure described in the preparation of N-γ-(p-bromophenyl)-butyrylvaline.

N - β - naphthoxyacetylvaline thus prepared melted at about 145–146° C. Analysis showed the presence of 4.74 percent nitrogen as compared with the calculated value of 4.65 percent nitrogen.

*Preparation of N-(2'-hydroxyethyl)-2,4-dichlorophenylacetamide*

N-(2'-hydroxyethyl)-2,4-dichlorophenylacetamide represented by the formula

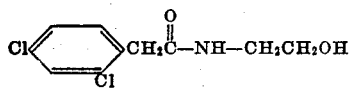

may be prepared in the following manner:

A solution prepared by dissolving 65.5 g. of 2,4-dichlorobenzyl chloride in 200 cc. of ethanol is added slowly and with stirring to a refluxing solution of 25 g. of potassium cyanide dissolved in a mixture of 40 cc. of water and 100 cc. of alcohol. Refluxing is continued for about 7–8 hours. The alcohol is removed from the reaction mixture by evaporation in vacuo and the residue treated with a mixture of 300 cc. of concentrated hydrochloric acid and 200 cc. of water and the resulting mixture refluxed for about 15 hours. The reaction mixture is cooled and extracted with several portions of ether. The ether extracts are combined and then extracted with dilute sodium carbonate solution. The sodium carbonate solution is acidified with hydrochloric acid whereupon a precipitate of 2,4-dichlorophenylacetic acid separates. The 2,4-dichlorophenylacetic acid is dissolved in about 500 cc. of absolute ethanol. The solution is saturated with dry hydrogen chloride gas and refluxed for about 15 hours. The bulk of the alcohol is evaporated in vacuo from the reaction mixture and the residue is treated with water whereupon ethyl 2,4-dichlorophenylacetate separates as an oil.

13.5 g. of ethyl 2,4-dichlorophenylacetate and 4 g. of ethanolamine are reacted according to the procedure described in the preparation of N-(2-hydroxyethyl)-o-fluorophenylacetamide. N-(2'-hydroxyethyl)-2,4-dichlorophenylacetamide thus prepared melted at about 118–119° C. Analysis showed the presence of 5.71 percent nitrogen as compared with the calculated value of 5.64 percent nitrogen.

*Preparation of N-(2-hydroxyethyl)-p-phenyl-mercaptophenylacetamide*

N-(2-hydroxyethyl)-p-phenylmercaptophenyl-acetamide represented by the formula

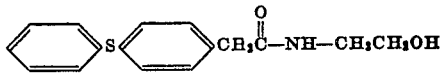

may be prepared in the following manner:

175 g. of aluminum chloride are mixed with 400 cc. of carbon bisulfide and the mixture cooled to about 0° C. To this mixture is added slowly with cooling and stirring, a mixture of 165 g. of phenylsulfide and 100 g. of acetyl chloride. After the addition is completed the reaction mixture is stirred for two hours and is then allowed to warm to room temperature and is stirred for an additional two hours. The reaction mixture is then poured into a mixture of ice and hydrochloric acid. The carbon disulfide is distilled from the mixture and the residue comprising water and an oily layer of p-phenylmercapto-acetophenone is extracted with ether. The ether is evaporated and the residue comprising p-phenylmercaptoacetophenone is purified by vacuum distillation. p - Phenylmercaptoacetophenone thus prepared boiled at about 180° C. at 1 mm. pressure. Analysis showed the presence of 73.54 percent carbon and 4.93 percent hydrogen as compared with the calculated values of 73.64 percent carbon and 5.30 percent hydrogen.

90 g. of p-phenylmercaptoacetophenone, 19 g. of sulfur and 53 cc. of morpholine are refluxed for about 15 hours. The morpholine is removed from the reaction mixture by evaporation in vacuo and a mixture of 500 cc. of hydrochloric acid and 200 cc. of acetic acid and 50 cc. of water are added to the residue and the mixture is refluxed for about 12 hours. The reaction mixture is then diluted with about 1 liter of water and the mixture extracted with ether. The ether extract is separated and is then extracted with dilute sodium hydroxide solution. The aqueous alkaline extract is acidified with hydrochloric acid whereupon p-phenylmercaptophenylacetic acid precipitates as a solid. The p-phenylmercapto-phenylacetic acid is dried and esterified by refluxing it for about 10 hours with 400 cc. of absolute ethanol containing 10 cc. of concentrated sulfuric acid. The bulk of the alcohol is removed by evaporation in vacuo and the residue is poured into cold water whereupon ethyl p-phenylmercaptophenylacetate separates as an oil. The ethyl p-phenylmercaptophenylacetate is extracted with ether, the ether evaporated and the residue comprising ethyl p-phenylmercapto-phenyl-acetate is purified by vacuum distillation. Ethyl p-phenylmercapto-phenylacetate thus prepared boiled at about 163° C. at 0.65 mm. pressure. Analysis showed the presence of 70.04 percent carbon and 5.83 percent hydrogen as compared with the calculated values of 70.55 percent carbon and 5.92 percent hydrogen.

17.5 g. of ethyl p-phenylmercaptophenylacetate and 4 g. of ethanolamine are reacted according to the procedure described in the preparation of N - (2 - hydroxyethyl) - o - fluorophenylacetamide. N - (2 - hydroxyethyl) - p - phenylmercapto-phenylacetamide thus prepared melted at about 89–90° C. Analysis showed the presence of 4.97 percent nitrogen as compared with the calculated value of 4.93 percent nitrogen.

*Preparation of N-(2-hydroxyethyl)-β-naphthyl-mercaptoacetamide*

N-(2 - hydroxyethyl) - β - naphthylmercapto-acetamide represented by the formula

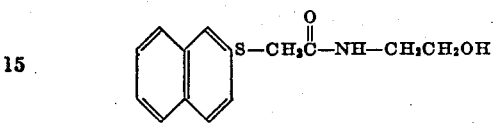

may be prepared in the following manner:

12. g. of sodium are dissolved in 300 cc. of absolute ethanol and to this solution are added 80 g. of β-thionaphthol and 65 g. of ethyl chloroacetate and the mixture is refluxed with stirring for about 12 hours. The bulk of the alcohol is removed in vacuo and water is added to the residue whereupon ethyl β-naphthylmercapto-acetate separates as an oil. The ethyl β-naphthylmercaptoacetate is extracted with ether, the ether evaporated and the residue of ethyl β-naphthylmercaptoacetate purified by vacuum distillation. Ethyl β - naphthylmercaptoacetate thus prepared boiled at about 148–150° C. at 0.2 mm. pressure. Analysis showed the presence of 68.25 percent carbon and 5.94 percent hydrogen as compared with the calculated values of 68.26 percent carbon and 5.72 percent hydrogen.

34 g. of ethyl β-naphthylmercaptoacetate and 8 g. of ethanolamine are reacted according to the procedure described in the preparation of N-(2-hydroxyethyl) - o - fluoroacetamide. N - (2-hydroxyethyl) - β - naphthylmercaptoacetamide thus prepared melted at about 93–95° C. Anaylsis showed the presence of 5.40 percent nitrogen as compared with the calculated value of 5.36 percent nitrogen.

*Preparation of N-(2-hydroxyethyl)-p-allyloxy-phenylacetamide*

N - (2 - hydroxyethyl) - p - allyloxyphenylacet-amide represented by the formula

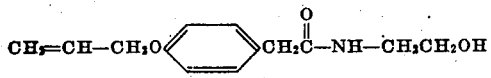

may be prepared in the following manner:

To a solution of 30 g. of sodium methoxide dissolved in 350 cc. of absolute ethanol is added a solution of 90 g. of ethyl p-hydroxyphenylacetate dissolved in 100 cc. of absolute ethanol. The mixture is refluxed with stirring and 70 g. of allyl bromide are added slowly and the refluxing is continued for about 12 hours. The bulk of the alcohol is then distilled from the reaction mixture and the residue is treated with water. The oil which separates is extracted with ether, the ether extract washed with dilute potassium hydroxide solution and the ether evaporated. The oily residue is treated with a mixture of 100 g. of potassium hydroxide, 600 cc. of ethanol and 100 cc. of water and the mixture refluxed for about 15 hours. The alcohol is removed from the reaction mixture by evaporation in vacuo and about 300 cc. of water are added to the residue. The aqueous solution is acidified with hydrochloric acid whereupon p-allyloxyphenylacetic acid precipitates as a solid. The p-allyloxyphenylacetic acid is dried and is then added to a solution of 10 g. of benzenesulfonic acid dissolved in 500 cc. of absolute ethanol and the mixture is refluxed for about 15 hours. The bulk of the alcohol is removed from the reaction mixture by evaporation in vacuo and the residue is treated with water whereupon ethyl p-allyloxyphenylacetate separates as an oil. The ethyl p-allyloxyphenylacetate is extracted with ether, the ether extract washed with dilute sodium hydroxide solution and the ether evaporated leaving an oily residue comprising ethyl p-allyloxyphenylacetate which is purified by vacuum distillation. Ethyl p-allyloxyphenylacetate thus prepared boiled at about 126–127° C. at 0.5 mm. pressure. Analysis showed the presence of 70.54 percent carbon and 7.72 percent hydrogen as compared with the calculated values of 70.88 percent carbon and 7.32 percent hydrogen.

18.4 g. of ethyl p-allyloxyphenylacetate and 6 g. of ethanolamine are reacted according to the procedure described in the preparation of N-(2-hydroxyethyl)-o-fluorophenylacetamide. N - (2-hydroxyethyl) - p - allyloxyphenylacetamide thus prepared melted at about 84–85° C. Analysis showed the presence of 6.28 percent nitrogen as compared with the calculated value of 5.94 percent nitrogen.

*Preparation of N-(2-hydroxyethyl)-p-aminophenylacetamide*

N-(2-hydroxyethyl)-p-aminophenylacetamide represented by the formula

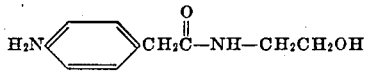

may be prepared by reacting 31.5 g. of ethyl p-aminophenylacetate and 14 g. of ethanolamine according to the procedure used in the preparation of N-(2-hydroxyethyl)-phenoxyacetamide.

N-(2-hydroxyethyl)-p-aminophenylacetamide thus prepared melted at about 103-104° C. Analysis showed the presence of 14.56 percent nitrogen as compared with the calculated value of 14.42 percent nitrogen.

*Preparation of N-(2'-hydroxyethyl)-3,4-dimethylphenylacetamide*

N - (2'-hydroxyethyl)-3,4-dimethylphenylacetamide represented by the formula

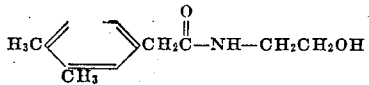

may be prepared in the following manner:

A mixture of 6.3 g. of 3,4-dimethylacetophenone, 19 g. of sulfur and 60 cc. of morpholine is refluxed about 15 hours, 500 cc. of hydrochloric acid and 200 cc. of acetic acid are then added and refluxing continued for about 12 hours. The reaction mixture is cooled and extracted with ether. The ether extract is extracted with dilute sodium hydroxide solution and the aqueous extract is acidified with hydrochloric acid whereupon 3,4-dimethylphenylacetic acid precipitates as a solid. The 3,4-dimethylphenylacetic acid is dried and esterified by dissolving it in 600 cc. of absolute alcohol containing 15 cc. of concentrated sulfuric acid and refluxing the solution for about 10 hours. The bulk of the alcohol is removed from the reaction mixture by evaporation in vacuo and the residue is treated with water whereupon ethyl 3,4-dimethylphenylacetate separates as an oil. The ethyl 3,4-dimethylphenylacetate is separated by extraction with ether, the ether evaporated and the residue comprising ethyl 3,4-dimethylphenylacetate purified by vacuum distillation. Ethyl 3,4-dimethylphenylacetate thus prepared boiled at about 93–95° C. at about 0.2 mm. pressure. Analysis showed the presence of 74.95 percent carbon and 8.59 percent hydrogen as compared with the calculated values of 74.96 percent carbon and 8.29 percent hydrogen.

44 g. of ethyl 3,4-dimethylphenylacetate and 18 g. of ethanolamine are reacted according to the procedure described in the preparation of N-(2-hydroxyethyl) - phenoxyacetamide. N - (2'-hydroxyethyl) - 3,4 - dimethylphenylacetamide thus prepared melted at about 99–100° C. Analysis showed the presence of 7.03 percent nitrogen as compared with the calculated value of 6.75 percent nitrogen.

*Preparation of N-(2-hydroxyethyl)-m-hydroxyphenylacetamide*

N-(2-hydroxyethyl) - m - hydroxyphenylacetamide represented by the formula

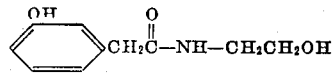

may be prepared from 14.4 g. of ethyl m-hydroxyphenylacetate and 5.5 g. of ethanolamine according to the procedure described in the preparation of N-(2-hydroxyethyl)-o-fluorophenylacetamide.

N-(2-hydroxyethyl)-m-hydroxyphenylacetamide thus prepared melted at about 92–93° C. Analysis showed the presence of 7.58 percent nitrogen as compared with the calculated value of 7.17 percent nitrogen.

*Preparation of N-p-chlorophenoxyacetylvaline*

N-p-chlorophenoxyacetylvaline represented by the formula

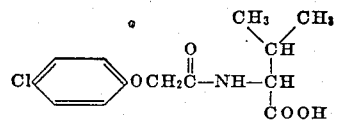

may be prepared by converting 9.3 g. of p-chlorophenoxyacetic acid to the corresponding acid chloride by means of thionyl chloride and reacting the p-chlorophenoxyacetyl chloride with valine according to the procedure described in the preparation of N - γ - (p - bromophenyl)-butyrylvaline.

N-p-chlorophenoxyacetylvaline thus prepared melted at about 136–137° C. Analysis showed the presence of 4.53 percent nitrogen as compared with the calculated value of 4.89 percent nitrogen.

*Preparation of N-(2'-hydroxyethyl) - 3 - chloro-4-bromophenylacetamide*

N - (2'-hydroxyethyl)-3-chloro-4-bromophenylacetamide represented by the formula

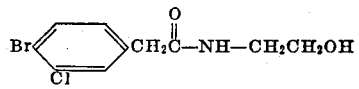

may be prepared in the following manner:

200 g. of 3-chloro-4-bromotoluene are heated to about 210° C. and treated with 160 g. of bromine which is added over a period of about 2 hours. The reaction product comprising 3-chloro-4-bromobenzyl bromide is refluxed for about 6 hours with a mixture of 100 g. of potassium cyanide, 200 cc. of water and 600 cc. of ethanol.

The reaction product is cooled and filtered to remove excess potassium cyanide and the potassium bromide formed during the reaction and the filtrate is partially evaporated in vacuo to remove the ethanol. The 3-chloro-4-bromobenzyl cyanide which separates as an oil is extracted with ether, the ether washed with dilute sodium hydroxide solution, dried over anhydrous magnesium sulfate and the ether evaporated leaving an oily residue of 3-chloro-4-bromobenzyl cyanide. The 3-chloro-4-bromobenzyl cyanide is hydrolyzed by refluxing it with a solution of 70 g. of potassium hydoxide dissolved in a mixture of 100 cc. of water and 500 cc. of ethanol. The ethanol is removed from the reaction mixture by distillation and the aqueous solution remaining is acidified with hydrochloric acid whereupon 3-chloro-4-bromophenylacetic acid precipitates as a solid. The 3-chloro-4-bromophenylacetic acid is extracted with ether, the ether solution dried over anhydrous magnesium sulfate and the ether evaporated leaving a crystalline residue of 3-chloro-4-bromophenylacetic acid.

114 g. of 3-chloro-4-bromophenylacetic acid are dissolved in 1 liter of absolute methanol containing 5 cc. of concentrated sulfuric acid and the solution is refluxed for about 4 hours. The bulk of the methanol is removed in vacuo and the residue poured into cold water. The methyl 3-chloro-4-bromophenylacetate which separates as an oil is extracted with ether. The ether extract is washed with dilute sodium bicarbonate solution, dried over anhydrous magnesium sulfate and the ether is distilled. The residue comprising methyl 3-chloro-4-bromophenylacetate is purified by distillation. Methyl 3-chloro-4-bromophenylacetate thus prepared boiled at about 117–121° C. at 2 mm. pressure. Analysis showed the presence of 40.75 percent carbon and 2.89 percent nitrogen as compared with the calculated values of 41.02 percent carbon and 3.06 percent hydrogen.

61 g. of methyl 3-chloro-4-bromophenylacetate and 15.5 g. of ethanolamine are reacted according to the procedure described in the preparation of N-(2-hydroxyethyl)-o-fluorophenylacetamide. N-(2'-hydroxyethyl)-3-chloro-4-bromophenylacetamide thus prepared melted at about 104–106° C. Analysis showed the presence of 4.95 percent nitrogen as compared with the calculated value of 4.79 percent nitrogen.

*Preparation of N-(2'-hydroxyethyl) 3,4-dibromophenylacetamide*

N-(2'-hydroxyethyl)-3-4-dibromophenylacetamide represented by the formula

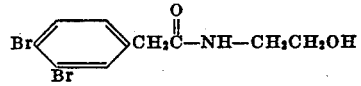

may be prepared in the following manner:

196 g. of 3-bromo-4-aminotoluene are added to a mixture of 186 g. of concentrated sulfuric acid and 700 cc. of ice. The mixture is maintained at about 10° C. and treated over a period of about 15 minutes with 69 g. of sodium nitrite dissolved in 115 cc. of water, and subsequently 200 g. of sodium bromide are added. The reaction mixture is maintained at about 10° C. and is added slowly to a solution of 71 g. of cuprous bromide dissolved in a mixture of 115 g. of 48 percent hydrobromic acid and 1,000 cc. of water. During this slow addition steam is passed through the cuprous bromide solution in order to distill the 3,4-dibromotoluene formed during the reaction. The distillate comprising a mixture of water and 3,4-dibromotoluene is extracted with benzene, the benzene extract dried with anhydrous sodium sulfate and the benzene removed by evaporation in vacuo. The residual oil comprising 3,4-dibromotoluene is purified by vacuum distillation. 3,4-dibromotoluene thus prepared boiled at about 113° C. at 6 mm. pressure.

3,4-dibromotoluene is converted to methyl 3,4-dibromophenylacetate through the intermediate compounds 3,4-dibromobenzyl bromide, 3,4-dibromobenzyl cyanide and 3,4-dibromophenylacetic acid, by substantially the same procedure as described in the preparation of methyl 3-chloro-4-bromophenylacetate.

44 g. of methyl 3,4-dibromophenylacetate and 9.5 g. of ethanolamine are heated at about 110° C. for 16 hours. The reaction mixture is cooled and the solidified reaction product comprising N-(2'-hydroxyethyl)-3,4-dibromophenylacetamide is purified by recrystallization from a mixture consisting of 30 percent methanol and 70 per cent ethyl acetate. N-(2'-hydroxyethyl)-3,4-dibromophenylacetamide thus prepared melted at about 125–127° C. Analysis showed the presence of 4.22 percent nitrogen as compared with the calculated value of 4.16 percent nitrogen.

We claim:

1. The method of producing a novel penicillin which comprises growing a penicillin-producing mold in association with a culture medium containing nutrient material and an effective amount less than about one percent of a compound represented by the formula

wherein R represents a monocyclic radical having a five-membered sulfur-containing ring, $n$ represents an odd integer from 1 to 5 inclusive, and X represents a radical of the group consisting of carboxy, carboxy-ester, carboxy-salt, carboxyamide, carbinol, carbinylamine, and aldehyde.

2. The method of producing a novel penicillin which comprises growing a penicillin-producing mold in association with a culture medium containing nutrient material and an effective amount less than about one percent of a compound represented by the formula

wherein Th represents a thienyl radical, and X represents a radical of the group consisting of carboxy, carboxy-ester, carboxyl-salt, carboxyamide, carbinol, carbinylamine, and aldehyde.

3. A culture medium for the fermentative production of a novel penicillin through the growth of a penicillin-producing mold, said culture medium comprising nutrient material and an effective amount less than about one percent of a compound represented by the formula

wherein R represents a monocyclic radical having a five-membered sulfur-containing ring, $n$ represents an odd integer from 1 to 5 inclusive, and X represents a radical of the group consisting of carboxy, carboxy-ester, carboxy-salt, carboxyamide, carbinol, carbinylamine and aldehyde.

OTTO K. BEHRENS.
JOSEPH W. CORSE.
REUBEN G. JONES.
QUENTIN F. SOPER.

(References on following page)

REFERENCES CITED

The following references are of record in the file of this patent:

UNITED STATES PATENTS

| Number | Name | Date |
|---|---|---|
| 2,399,840 | Wachtel | May 7, 1946 |
| 2,400,143 | Waksman | May 17, 1946 |
| 2,423,873 | Coghill | July 15, 1947 |

OTHER REFERENCES

Biosynthesis of the Penicillins, Part III, C. P. S. 298, Br. 115, Glaxo Labs. Oct. 3, 1944, pages 1, 8 (Table III).

Abbott Laboratories, Progress Report to May 15, 1945, pages 5 and 6; ibidem, to April 15, 1945, page 9.